United States Patent
Hoshino et al.

(10) Patent No.: US 11,542,407 B2
(45) Date of Patent: Jan. 3, 2023

(54) FLUORINATED ETHER COMPOUND, FLUORINATED ETHER COMPOSITION, COATING LIQUID, ARTICLE AND ITS PRODUCTION METHOD

(71) Applicant: AGC Inc., Chiyoda-ku (JP)

(72) Inventors: Taiki Hoshino, Chiyoda-ku (JP); Keigo Matsuura, Chiyoda-ku (JP); Eiichiro Anraku, Chiyoda-ku (JP); Masahiro Ito, Chiyoda-ku (JP); Hiromasa Yamamoto, Chiyoda-ku (JP); Motoshi Aoyama, Chiyoda-ku (JP); Yusuke Tomiyori, Chiyoda-ku (JP); Yutaka Furukawa, Chiyoda-ku (JP)

(73) Assignee: AGC Inc., Chiyoda-ku (JP)

(*) Notice: Subject to any disclaimer, the term of this patent is extended or adjusted under 35 U.S.C. 154(b) by 534 days.

(21) Appl. No.: 16/774,152

(22) Filed: Jan. 28, 2020

(65) Prior Publication Data
US 2020/0157376 A1 May 21, 2020

Related U.S. Application Data

(63) Continuation of application No. PCT/JP2018/028133, filed on Jul. 26, 2018.

(30) Foreign Application Priority Data

Aug. 22, 2017 (JP) .............................. JP2017-159698

(51) Int. Cl.
| | |
|---|---|
| C09D 5/00 | (2006.01) |
| C09D 171/02 | (2006.01) |
| C08G 65/336 | (2006.01) |
| C08G 65/337 | (2006.01) |

(52) U.S. Cl.
CPC .......... *C09D 171/02* (2013.01); *C08G 65/336* (2013.01); *C08G 65/337* (2013.01); *C09D 5/00* (2013.01); *C08G 2650/48* (2013.01)

(58) Field of Classification Search
CPC ...... C09D 5/00; C09D 171/02; C08G 65/336; C08G 65/337; C08G 2650/48

USPC .......................................................... 427/384
See application file for complete search history.

(56) References Cited

U.S. PATENT DOCUMENTS

| | | | | |
|---|---|---|---|---|
| 2006/0014895 | A1* | 1/2006 | Shiono | C08L 71/02 428/447 |
| 2009/0084602 | A1* | 4/2009 | Fukuda | H01L 23/10 174/520 |
| 2018/0142062 | A1* | 5/2018 | Hoshino | C08G 65/226 |

FOREIGN PATENT DOCUMENTS

| | | |
|---|---|---|
| JP | H07-053919 A | 2/1995 |
| WO | WO 2017/038832 A1 | 3/2017 |
| WO | WO 2018/056410 A1 | 3/2018 |

OTHER PUBLICATIONS

International Search Report dated Oct. 23, 2018 in PCT/JP2018/028133 filed on Jul. 26, 2018, 2 pages.

* cited by examiner

*Primary Examiner* — Kelechi C Egwim

(74) *Attorney, Agent, or Firm* — Oblon, McClelland, Maier & Neustadt, L.L.P.

(57) ABSTRACT

To provide a fluorinated ether compound, a fluorinated ether composition and a coating liquid capable of forming a surface layer excellent in initial water/oil repellency, fingerprint stain removability, abrasion resistance, light resistance and chemical resistance, an article having a surface layer, and a method for producing it.

A fluorinated ether compound represented by A-O—$(R^{f1}$-O$)_m$—$R^{f2}$-$Z^1$-$Q^1$ $(R^1)_b$, wherein A is a $C_{1-20}$ perfluoroalkyl group, $R^{f1}$ is a linear fluoroalkylene group, m is an integer of from 2 to 500, $R^{f2}$ is a linear fluoroalkylene group, $Z^1$ is a single bond, —$(CR^2R^3)_c$— (wherein $R^2$ and $R^3$ are a hydrogen atom, a $C_{1-6}$ monovalent organic group or the like, and c is an integer of from 1 to 10), a specific bond or a bivalent organic group having a specific bond, $Q^1$ is a group having a (b+1) valent ring, $R^1$ is a monovalent organic group having at least one hydrolyzable silyl group, and b is an integer of at least 2.

15 Claims, No Drawings

FLUORINATED ETHER COMPOUND, FLUORINATED ETHER COMPOSITION, COATING LIQUID, ARTICLE AND ITS PRODUCTION METHOD

This application is a continuation of PCT Application No. PCT/JP2018/028133, filed on Jul. 26, 2018, which is based upon and claims the benefit of priority from Japanese Patent Application No. 2017-159698 filed on Aug. 22, 2017. The contents of those applications are incorporated herein by reference in their entireties.

TECHNICAL FIELD

The present invention relates to a fluorinated ether compound, a fluorinated ether composition, a coating liquid, an article and its production method.

BACKGROUND ART

A fluorinated ether compound having a poly(oxyperfluoroalkylene) chain is capable of forming on a surface of a substrate a surface layer having high lubricity, water/oil repellency, etc. and thus is suitably used for a surface treatment agent. A surface treatment agent containing the fluorinated ether compound is used in an application where it is desired to maintain, for a long period of time, a performance (abrasion resistance) whereby water/oil repellency is less likely to be lowered even if the surface layer is rubbed repeatedly with fingers, and a performance (fingerprint stain removability) whereby a fingerprint adhering to the surface layer can be readily removed by wiping, for example, as a surface treatment agent for a member constituting a plane of a touch panel to be touched with fingers, a spectacle lens, a display of a wearable terminal, etc.

As a fluorinated ether compound which is capable of forming on a surface of a substrate a surface layer excellent in abrasion resistance and fingerprint stain removability, the following has been proposed.

A fluorinated ether compound which has a poly(oxyperfluoroalkylene) chain and two hydrolyzable silyl groups introduced to one terminal of the chain via a branch by a nitrogen atom (Patent Document 1).

PRIOR ART DOCUMENTS

Patent Document

Patent Document 1: WO2017/038832

DISCLOSURE OF INVENTION

Technical Problem

In recent years, a surface layer of e.g. a member constituting a surface to be touched with fingers of a touch panel is required to have further improved abrasion resistance, light resistance and chemical resistance. Accordingly, a fluorinated ether compound capable of forming a surface layer more excellent in abrasion resistance, light resistance and chemical resistance may sometimes be required.

An object of the present invention is to provide a fluorinated ether compound capable of forming a surface layer excellent in initial water/oil repellency, fingerprint stain removability, abrasion resistance, light resistance and chemical resistance; a fluorinated ether composition and a coating liquid containing the fluorinated ether compound; an article having a surface layer excellent in initial water/oil repellency, fingerprint stain removability, abrasion resistance, light resistance and chemical resistance, and a method for producing it.

Another object of the present invention is to provide a fluorinated ether compound useful as an intermediate of a fluorinated ether compound suitably used for a surface treatment agent.

Solution to Problem

The present invention provides a fluorinated ether compound, a fluorinated ether composition, a coating liquid, an article, a method for producing an article, and a fluorinated ether compound according to another embodiment, having the following constructions [1] to [15].

[1] A fluorinated ether compound, which is a compound represented by the following formula 1:

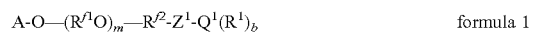

$$A\text{-}O\text{---}(R^{f1}O)_m\text{---}R^{f2}\text{-}Z^1\text{-}Q^1(R^1)_b \qquad \text{formula 1}$$

wherein A is a $C_{1\text{-}20}$ perfluoroalkyl group, $R^{f1}$ is a linear fluoroalkylene group, m is an integer of from 2 to 500, $(R^{f1}O)_m$ may consist of two or more types of $R^{f1}O$ differing in the number of carbon atoms, $R^{f2}$ is a linear fluoroalkylene group (having at least one fluorine atom bonded to the carbon atom at the terminal on the $Z^1$ side), $Z^1$ is a bond selected from the group consisting of —C(O)—, —C(O)NH—, —OC(O)O—, —NHC(O)O—, —NHC(O)NH— and —SO$_2$NH—, a bivalent organic group having a bond selected from the above group, a single bond or a group represented by the following formula g1, $Q^1$ is a group having a (b+1) valent ring (excluding an organopolysiloxane ring) such that $Z^1$ and $R^1$ are directly bonded to an atom constituting the ring, $R^1$ is a monovalent organic group having at least one hydrolyzable silyl group, b is an integer of at least 2, the b $R^1$ may be the same or different,

formula g1 wherein $R^2$ and $R^3$ are each independently a hydrogen atom, a halogen atom (excluding a fluorine atom) or a $C_{1\text{-}6}$ monovalent organic group (excluding one having a hydrolyzable silyl group), c is an integer of from 1 to 10, and when c is at least 2, the c ($CR^2R^3$) may be the same or different.

[2] The fluorinated ether compound according to [1], wherein the ring in $Q^1$ is a ring selected from the group consisting of a 3- to 8-membered alicyclic ring, a benzene ring, a 3- to 8-membered heterocyclic ring, and a condensed ring of two or more of such rings.

[3] The fluorinated ether compound according to [1] or [2], wherein $Z^1$ is a bond selected from the group consisting of —C(O)— and —C(O)NH—, a bivalent organic group having a bond selected from the group consisting of —C(O)— and —C(O)NH—, a single bond, or a group represented by the formula g1.

[4] The fluorinated ether compound according to any one of [1] to [3], wherein $R^1$ is a group represented by the following formula g2:

formula g2 wherein $Q^2$ is a (p+1) valent organic group (excluding one having a hydrolyzable silyl group), $R^4$ is a hydrogen atom or a monovalent hydrocarbon group, L is a hydrolyzable group, n is an integer of from 0 to 2, p is an integer of at least 1, and when p is at least 2, the p [—SiR$^4_n$L$_{3-n}$] may be the same or different.

[5] The fluorinated ether compound according to [4], wherein the group represented by the formula g2 is a group represented by the following formula g3 or g4:

formula g3

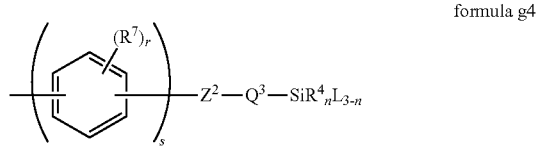

formula g4 wherein $R^5$ and $R^6$ are each independently a hydrogen atom, a $C_{1-6}$ monovalent organic group (excluding one having a hydrolyzable silyl group) or -Q$^3$-SiR$^4_n$L$_{3-n}$, q is an integer of from 0 to 10, when q is at least 2, the q (CR$^5$R$^6$) may be the same or different, $R^7$ is a $C_{1-6}$ monovalent organic group (excluding one having a hydrolyzable silyl group) or -Z$^2$-Q$^3$-SiR$^4_n$-L$_{3-n}$, r is an integer of from 0 to 4, when r is at least 2, the r $R^7$ may be the same or different, s is 1 or 2, when s is 2, the two ($\varphi$)($R^7$)$_r$ (wherein $\varphi$ is a benzene ring) may be the same or different, $Z^2$ is a single bond or —C(O)N(R$^8$)—, $R^8$ is a hydrogen atom or an alkyl group, $Q^3$ is a $C_{2-10}$ alkylene group, $R^4$ is a hydrogen atom or a monovalent hydrocarbon group, L is a hydrolyzable group, n is an integer of from 0 to 2, and the plurality of -Q$^3$-SiR$^4_n$L$_{3-n}$ may be the same or different.

[6] A fluorinated ether composition comprising at least one type of the fluorinated ether compound as defined in any one of [1] to [5], and other fluorinated ether compound.

[7] A coating liquid comprising the fluorinated ether compound as defined in any one of [1] to [5] or the fluorinated ether composition as defined in [6], and a liquid medium.

[8] An article comprising a substrate and a surface layer formed of the fluorinated ether compound as defined in any one of [1] to [5] or the fluorinated ether composition as defined in [6] on a surface of the substrate.

[9] A method for producing an article, which comprises treating a surface of a substrate by dry coating method using the fluorinated ether compound as defined in any one of [1] to [5] or the fluorinated ether composition as defined in [6] to form a surface layer formed of the fluorinated ether compound or the fluorinated ether composition on the surface of the substrate.

[10] A method for producing an article, which comprises applying the coating liquid as defined in [7] to a surface of a substrate by wet coating method, followed by drying to form a surface layer formed of the fluorinated ether compound or the fluorinated ether composition on the surface of the substrate.

[11] A fluorinated ether compound, which is a compound represented by the following formula 2:

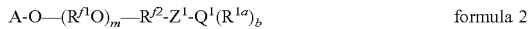

formula 2 wherein A is a $C_{1-20}$ perfluoroalkyl group, $R^{f1}$ is a linear fluoroalkylene group, m is an integer of from 2 to 500, ($R^{f1}$O)$_m$ may consist of two or more types of $R^{f1}$O differing in the number of carbon atoms, $R^{f2}$ is a linear fluoroalkylene group (having at least one fluorine atom bonded to the carbon atom at the terminal on the $Z^1$ side), $Z^1$ is a bond selected from the group consisting of —C(O)—, —C(O)NH—, —OC(O)O—, —NHC(O)O—, —NHC(O)NH— and —SO$_2$NH—, a bivalent organic group having a bond selected from the above group, a single bond or a group represented by the following formula g1, $Q^1$ is a group having a (b+1) valent ring (excluding an organopolysiloxane ring) such that $Z^1$ and $R^1$ are directly bonded to an atom constituting the ring, $R^{1a}$ is a monovalent organic group having at least one ω-alkenyl group (excluding one having a hydrolyzable silyl group), b is an integer of at least 2, the b $R^{1a}$ may be the same or different,

formula g1 wherein $R^2$ and $R^3$ are each independently a hydrogen atom, a halogen atom (excluding a fluorine atom) or a $C_{1-6}$ monovalent organic group (excluding one having a hydrolyzable silyl group), c is an integer of from 1 to 10, and when c is at least 2, the c (CR$^2$R$^3$) may be the same or different.

[12] The fluorinated ether compound according to [11], wherein the ring in $Q^1$ is a ring selected from the group consisting of a 3- to 8-membered alicyclic ring, a benzene ring, a 3- to 8-membered heterocyclic ring, and a condensed ring of two or more of such rings.

[13] The fluorinated ether compound according to [11] or [12], wherein $Z^1$ is a bond selected from the group consisting of —C(O)— and —C(O)NH—, a bivalent organic group having a bond selected from the group consisting of —C(O)— and —C(O)NH—, a single bond, or a group represented by the formula g1.

[14] The fluorinated ether compound according to any one of [11] to [13], wherein $R^{1a}$ is a group represented by the following formula g5:

    formula g5 wherein $Q^{2a}$ is a single bond (only when p is 1) or a (p+1) valent organic group (excluding one having a hydrolyzable silyl group), and p is an integer of at least 1.

[15] The fluorinated ether compound according to [14], wherein the group represented by the formula g5 is a group represented by the following formula g6 or g7:

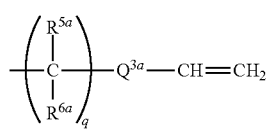    formula g6

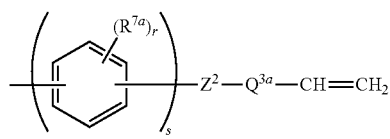    formula g7 wherein $R^{5a}$ and $R^{6a}$ are each independently a hydrogen atom, a $C_{1-6}$ monovalent organic group (excluding one having a hydrolyzable silyl group) or $-Q^{3a}$-CH=$CH_2$, q is an integer of from 0 to 10, when q is at least 2, the q ($CR^{5a}R^{6a}$) may be the same or different, $R^{7a}$ is a $C_{1-6}$ monovalent organic group (excluding one having a hydrolyzable silyl group) or $-Z^2-Q^{3a}$-CH=$CH_2$, r is an integer of from 0 to 4, when r is at least 2, the r $R^{7a}$ may be the same or different, s is 1 or 2, when s is 2, the two ($\varphi(R^{7a})_r$) (wherein $\varphi$ is a benzene ring) may be the same or different, $Z^2$ is a single bond or —C(O)N($R^8$)—, $R^8$ is a hydrogen atom or an alkyl group, $Q^{3a}$ is a single bond or a $C_{1-8}$ alkylene group, and the plurality of $Q^{3a}$ may be the same or different.

Advantageous Effects of Invention

By the fluorinated ether compound of the present invention, it is possible to form a surface layer excellent in initial water/oil repellency, fingerprint stain removability, abrasion resistance, light resistance and chemical resistance. By the fluorinated ether composition of the present invention, it is possible to form a surface layer excellent in initial water/oil repellency, fingerprint stain removability, abrasion resistance, light resistance and chemical resistance.

By the coating liquid of the present invention, it is possible to form a surface layer excellent in initial water/oil repellency, fingerprint stain removability, abrasion resistance, light resistance and chemical resistance.

The article of the present invention has a surface layer excellent in initial water/oil repellency, fingerprint stain removability, abrasion resistance, light resistance and chemical resistance.

According to the method for producing an article of the present invention, it is possible to produce an article having a surface layer excellent in initial water/oil repellency, fingerprint stain removability, abrasion resistance, light resistance and chemical resistance.

According to another embodiment, the fluorinated ether compound of the present invention is useful as an intermediate of the fluorinated ether compound suitably used for a surface treatment agent.

DESCRIPTION OF EMBODIMENTS

In this specification, a compound represented by the formula 1 will be referred to as compound 1. Compounds represented by other formulae will be referred to in the same manner.

Further, a group represented by the formula g1 will be referred to as group g1. Groups represented by other formulae will be referred to in the same manner.

In this specification, meanings of the following terms are as follows.

An "etheric oxygen atom" means an oxygen atom forming an ether bond (—O—) between carbon atoms. The chemical formula of the oxyfluoroalkylene unit is represented so that its oxygen atom is described on the right-side of the fluoroalkylene group.

A "hydrolyzable silyl group" means a group capable of forming a silanol group (Si—OH) by being hydrolyzed, and is $SiR^4{}_nL_{3-n}$ in the formula g2.

A "surface layer" means a layer formed on the surface of a substrate.

The "number average molecular weight" of the fluorinated ether compound is calculated by obtaining the number (average value) of oxyperfluoroalkyl groups on the basis of terminal group, by $^1$H-NMR and $^{19}$F-NMR. The terminal group may, for example, be A or a hydrolyzable silyl group in the formula 1.

[Fluorinated Ether Compound]

The fluorinated ether compound of the present invention is compound 1.

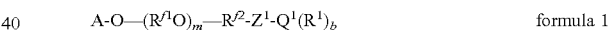    formula 1 wherein A is a $C_{1-20}$ perfluoroalkyl group, $R^{f1}$ is a linear fluoroalkylene group, m is an integer of from 2 to 500, $(R^{f1}O)_m$ may consist of two or more types of $R^{f1}O$ differing in the number of carbon atoms, $R^{f2}$ is a linear fluoroalkylene group (having at least one fluorine atom bonded to the carbon atom at the terminal on the $Z^1$ side), $Z^1$ is a bond selected from the group consisting of —C(O)—, —C(O)NH—, —OC(O)O—, —NHC(O)O—, —NHC(O)NH— and —$SO_2$NH—, a bivalent organic group having a bond selected from the above group, a single bond or group g1, $Q^1$ is a group having a (b+1) valent ring (excluding an organopolysiloxane ring) such that $Z^1$ and $R^1$ are directly bonded to an atom constituting the ring, $R^1$ is a monovalent organic group having at least one hydrolysable silyl group, b is an integer of at least 2, the b $R^1$ may be the same or different.

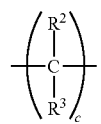    formula g1 wherein $R^2$ and $R^3$ are each independently a hydrogen atom, a halogen atom (excluding a fluorine atom) or a $C_{1-6}$ monovalent organic group (excluding one having a hydrolysable silyl group), c is an integer of from 1 to 10, and when c is at least 2, the c (CR²R³) may be the same or different.

The number of carbon atoms in A is preferably from 1 to 10, more preferably from 1 to 6, particularly preferably from 1 to 3, in that the surface layer formed of the compound 1 will be more excellent in lubricity and abrasion resistance.

The number of carbon atoms in $R^{f1}$ is preferably from 1 to 6, in view of more excellent abrasion resistance and fingerprint stain removability of the surface layer.

$R^{f1}$ is preferably a perfluoroalkylene group in view of more excellent abrasion resistance and lubricity of the surface layer. $R^{f1}$ other than the perfluoroalkylene group is preferably a $C_{2-6}$ polyfluoroalkylene group having from 1 to 4 hydrogen atoms and at least two fluorine atoms, more preferably a $C_{2-6}$ polyfluoroalkylene group having one or two hydrogen atoms and at least two fluorine atoms.

The proportion of the perfluoroalkylene group to the entire $R^{f1}$ is preferably at least 60 mol %, more preferably at least 80 mol %, particularly preferably 100 mol %, in view of more excellent abrasion resistance and lubricity of the surface layer.

m is preferably an integer of from 2 to 200, more preferably an integer of from 5 to 150, particularly preferably an integer of from 10 to 100. When m is at least the lower limit value of the above range, the surface layer will be more excellent in water/oil repellency. When m is at most the upper limit value of the above range, the surface layer will be more excellent in abrasion resistance. That is, if the number average molecular weight of the compound 1 is too high, the number of hydrolyzable silyl groups present per unit molecular weight decreases, and the abrasion resistance of the surface layer will be lowered.

In $(R^{f1}O)_m$, when at least two types of $R^{f1}O$ are present, the bonding order of the respective $R^{f1}O$ is not limited. For example, when $CF_2O$ and $CF_2CF_2O$ are present, such $CF_2O$ and $CF_2CF_2O$ may be arranged randomly, alternately or in block.

At least two types of $R^{f1}O$ being present is meant that at least two types of $R^{f1}O$ differing in the number of carbon atoms are present, at least two types of $R^{f1}O$ differing in the number of hydrogen atoms are present, at least two types of $R^{f1}O$ differing in the positions of hydrogen atoms are present, and at least two types of $R^{f1}O$ differing in whether side chains are present or not or in the type of side chains (e.g. the number of side chains, the number of carbon atoms in the side chain) even having the same number of carbon atoms, are present.

With respect to arrangement of at least two types of $R^{f1}O$, for example, a structure represented by $\{(CF_2O)_{m1}(CF_2CF_2O)_{m2}\}$ indicates that m1 pieces of $(CF_2O)$ and m2 pieces of $(CF_2CF_2O)$ are randomly arranged. Further, a structure represented by $(CF_2CF_2O—CF_2CF_2CF_2CF_2O)_{m5}$ indicates that m5 pieces of $(CF_2CF_2O)$ and m5 pieces of $(CF_2CF_2CF_2CF_2O)$ are alternately arranged.

As $(R^{f1}O)_m$, preferred is $(R^{f1}O)_m$ having the following structure in at least a part thereof.

$\{(CF_2O)_{m1}(CF_2CF_2O)_{m2}\}$
$(CF_2CF_2O)_{m3}$
$(CF_2CF_2CF_2O)_{m4}$
$(CF_2CF_2O—CF_2CF_2CF_2CF_2O)_{m5}$
$(CF_2CF_2CF_2CF_2CF_2O)_{m6}(CF_2O)_{m7}$
$(CF_2CF_2CF_2CF_2CF_2O)_{m6}(CF_2O)_{m7}$
$(CF_2CF_2CF_2CF_2CF_2CF_2O)_{m6}(CF_2O)_{m7}$
$(CF_2CF_2CF_2CF_2CF_2CF_2O)_{m6}(CF_2CF_2O)_{m7}$
$(CF_2CF_2CF_2CF_2CF_2O—CF_2O)_{m8}$
$(CF_2CF_2CF_2CF_2CF_2O—CF_2CF_2O)_{m8}$
$(CF_2CF_2CF_2CF_2CF_2CF_2O—CF_2O)_{m8}$
$(CF_2CF_2CF_2CF_2CF_2CF_2O—CF_2CF_2O)_{m8}$
$(CF_2O—CF_2CF_2CF_2CF_2CF_2O)_{m8}$
$(CF_2O—CF_2CF_2CF_2CF_2CF_2CF_2O)_{m8}$
$(CF_2CF_2O—CF_2CF_2CF_2CF_2O)_{m8}$
$(CF_2CF_2O—CF_2CF_2CF_2CF_2CF_2O)_{m8}$ wherein m1 is an integer of at least 1, m2 is an integer of at least 1, m1+m2 is an integer of from 2 to 500, m3 and m4 are each an integer of from 2 to 500, m5 is an integer of from 1 to 250, m6 and m7 are each an integer of at least 1, m6+m7 is an integer of from 2 to 500, and m8 is an integer of from 1 to 250.

$(R^{f1}O)_m$ is preferably as follows, in view of easy production of the compound 1.

$\{(CF_2O)_{m1}(CF_2CF_2O)m2\}$
$(CF_2CF_2O)_2\{(CF_2O)_{m1}(CF_2CF_2O)_{m2-2}\}$
$(CF_2CF_2CF_2O)_{m4}$
$(CF_2CF_2O—CF_2CF_2CF_2CF_2O)_{m5-1}CF_2CF_2O$
$(CF_2CF_2CF_2CF_2CF_2O—CF_2O)_{m8}$
$(CF_2CF_2CF_2CF_2CF_2CF_2O—CF_2O)_{m8}$
$(CF_2CF_2O—CF_2CF_2CF_2CF_2CF_2O)_{m8-1}CF_2CF_2O$
$(CF_2CF_2O—CF_2CF_2CF_2CF_2CF_2CF_2O)_{8-1}CF_2CF_2O$ wherein m2, m5 and m8 are selected so that m2-2, m5-1 and m8-1 are an integer of at least 1.

The number of carbon atoms in $R^{f2}$ is preferably from 1 to 8, more preferably from 1 to 6, particularly preferably from 1 to 4, in view of more excellent abrasion resistance and fingerprint stain removability of the surface layer.

$R^{f2}$ is preferably a perfluoroalkylene group, in view of more excellent abrasion resistance and lubricity of the surface layer.

The structure of $R^{f2}$ depends on the raw material and the method for preparing the compound 1. $R^{f2}$ is preferably —$CF_2CF_2$— in view of availability of the raw material.

$Z^1$ preferably contains no —C(O)O— excluding —OC(O)O— and —NHC(O)O—. —C(O)O— is likely to be cleaved e.g. by light or chemicals, and deteriorates light resistance and chemical resistance of the surface layer. $Z^1$ is preferably a bond selected from the group consisting of —C(O)— and —C(O)NH—, a bivalent organic group having a bond selected from the group consisting of —C(O)— and —C(O)NH—, a single bond or a group represented by the formula g1, in that the compound 1 is easily produced and the resulting surface layer will be more excellent in abrasion resistance, light resistance and chemical resistance.

The monovalent organic group as $R^2$ and $R^3$ in the group g1 is particularly preferably a $C_{1-4}$ monovalent organic group. $R^2$ and $R^3$ are each independently preferably a hydrogen atom or a $C_{1-4}$ alkyl group, particularly preferably a hydrogen atom or a methyl group, in view of availability of the raw material.

c in the group g1 is preferably an integer of from 1 to 6 in that the compound 1 is easily produced and the resulting surface layer will be more excellent in abrasion resistance, light resistance and chemical resistance.

The group g1 is preferably an alkylene group.

The number of carbon atoms in the bivalent organic group as $Z^1$ is preferably from 1 to 8, more preferably from 1 to 6, particularly preferably from 1 to 4.

$Z^1$ is particularly preferably a single bond, —$CH_2$—, —$CH_2CH_2$—, —$CH_2CH_2CH_2$—, —C(O)—, —C(O)NH— or —C(O)NHCH₂—, in that the compound 1 is easily produced and the resulting surface layer will be more excellent in abrasion resistance, light resistance and chemical resistance.

$Q^1$ is a group having a (b+1) valent ring, and $Z^1$ and $R^1$ are directly bonded to an atom constituting the ring, provided that the ring is a ring other than an organopolysiloxane ring. Hereinafter the ring in $Q^1$ is a ring other than an organopolysiloxane ring, unless otherwise specified.

The ring in $Q^1$ may be any of a monocyclic ring, a condensed polycyclic ring, a bridged ring, a spiro ring and a collected polycyclic ring, and may be a carbocyclic ring in which atoms constituting the rings are only carbon atoms, or may be a heterocyclic ring constituted by a hetero atom(s) having bivalent or higher valency and carbon atoms. Further, the bond between atoms constituting the ring may be a single bond or may be a multiple bond. Further, the ring may be an aromatic ring or a non-aromatic ring.

The monocyclic ring is preferably a 4-membered to 8-membered ring, more preferably a 5-membered ring or a 6-membered ring. The condensed polycyclic ring is preferably a condensed polycyclic ring having two or more 4-membered to 8-membered rings condensed, more preferably a condensed polycyclic ring having two or three rings selected from 5-membered rings and 6-membered rings, or a condensed polycyclic ring having one or two rings selected from 5-membered rings and 6-membered rings and one 4-membered ring condensed. The bridged ring is preferably a bridged ring in which a 5-membered or 6-membered ring is the largest ring, and the Spiro ring is preferably a spiro ring consisting of two of 4-membered to 6-membered rings. The collected polycyclic ring is preferably a collected polycyclic ring having two or three rings selected from 5-membered rings and 6-membered rings bonded via a single bond, one to three carbon atoms or one bivalent or trivalent hetero atom. In the collected polycyclic ring, each ring preferably has any of $Z^1$ and $R^1$ bonded thereto.

The hetero atom constituting the ring is preferably a nitrogen atom, an oxygen atom or a sulfur atom, more preferably a nitrogen atom or an oxygen atom. The number of hetero atoms constituting the ring is preferably at most 3. Further, when the number of hetero atoms constituting the ring is 2 or more, such hetero atoms may be different.

The ring in $Q^1$ is, in that the compound 1 is easily produced and the resulting surface layer will be more excellent in abrasion resistance, light resistance and chemical resistance, preferably one member selected from the group consisting of a 3- to 8-membered alicyclic ring, a benzene ring, a 3- to 8-membered heterocyclic ring, a condensed ring having two or three of such rings condensed, a bridged ring in which a 5-membered ring or a 6-membered ring is the largest ring, and a collected polycyclic ring having two or more of such rings bonded via a linking group selected from a single bond, an alkylene group having at most 3 carbon atoms, an oxygen atom and a sulfur atom.

A preferred ring is a benzene ring, a 5-membered or 6-membered alicyclic ring, a 5-membered or 6-membered heterocyclic ring having a nitrogen atom or an oxygen atom, or a condensed ring of a 5- or 6-membered carbocyclic ring and a 4- to 6-membered heterocyclic ring.

As specific rings, the following rings are preferred. In the following, rings having an oxo group (=O) bonded to the rings are also shown.

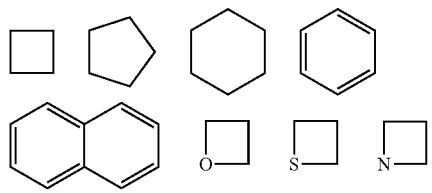

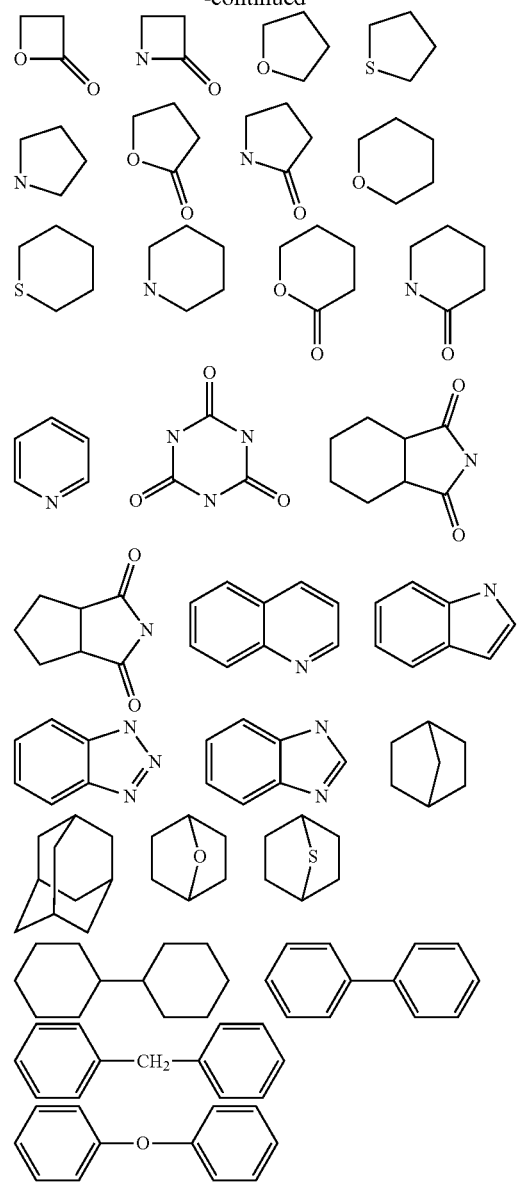

A connecting bond of an atom constituting the ring in $Q^1$, which is not constituting the ring is a connecting bond bonded to $Z^1$ or $R^1$, and the remaining connecting bonds if any are bonded to a hydrogen atom or a substituent. Such a substituent may, for example, be a halogen atom, an alkyl group (which may have an etheric oxygen atom between carbon atoms), a cycloalkyl group, an alkenyl group, an allyl group, an alkoxy group or an oxo group (=O).

Further, when one of carbon atoms constituting the ring has two connecting bonds bonded to $Z^1$ or $R^1$, $Z^1$ and $R^1$ may be bonded to the one carbon atom, or two $R^1$ may be bonded to the one carbon atom. $Z^1$ and $R^1$ are preferably bonded to separate ring-constituting atoms. The b $R^1$ may be bonded to separate ring-constituting atoms, two of them may be bonded to one ring-constituting carbon atom, and there may be two or more ring-constituting carbon atoms each having two $R^1$ bonded thereto.

b is preferably from 2 to 6, more preferably from 2 to 4, particularly preferably 2 or 3, in that the compound 1 is easily produced and the resulting surface layer will be more excellent in abrasion resistance, light resistance and chemical resistance. When b is at least the lower limit value of the above range, the compound 1 will be firmly bonded to the surface of the substrate, whereby the surface layer will be more excellent in abrasion resistance, light resistance and chemical resistance. When b is at most the upper limit value of the above range, the raw material will be easily available, and the compound 1 is easily produced. Further, the terminal on the hydrolyzable silyl group side of the compound 1 will not be bulky, and the density of the compound 1 on the surface of the substrate is relatively high and as a result, the surface layer will be more excellent in abrasion resistance, light resistance and chemical resistance.

$R^1$ is preferably group g2, whereby the effects of the present invention are likely to be obtained.

formula g2 wherein $Q^2$ is a (p+1) valent organic group (excluding one having a hydrolyzable silyl group), $R^4$ is a hydrogen atom or a monovalent hydrocarbon group, L is a hydrolyzable group, n is an integer of from 0 to 2, p is an integer of at least 1, and when p is at least 2, the p $[-SiR^4{}_nL_{3-n}]$ may be the same or different.

p is preferably from 1 to 3, more preferably 1 or 2, particularly preferably 1 in that the compound 1 is easily produced and the resulting surface layer will be more excellent in abrasion resistance, light resistance and chemical resistance.

The organic group as $Q^2$ is, in view of more excellent light resistance and chemical resistance of the surface layer, preferably a saturated hydrocarbon group or an aromatic hydrocarbon group, or a combination thereof. The number of carbon atoms in $Q^2$ is preferably from 2 to 20, particularly preferably from 2 to 12.

$SiR^4{}_nL_{3-n}$ is a hydrolyzable silyl group.

The compound 1 has at least two hydrolyzable silyl groups at its terminal. The compound 1 having at least two hydrolyzable silyl groups at its terminal is firmly chemically bonded to a substrate, and is thereby capable of forming a surface layer excellent in abrasion resistance.

Further, the compound 1 has hydrolyzable silyl groups only at one terminal. The compound 1 having hydrolyzable silyl groups only at one terminal is less likely to aggregate, and is thereby capable of forming a surface layer excellent in outer appearance.

L is a hydrolyzable group. The hydrolyzable group is a group which becomes a hydroxy group by hydrolysis reaction. That is, Si-L at the terminal of the compound 1 becomes a silanol group (Si—OH) by hydrolysis reaction. Silanol groups will further be intermolecularly reacted to form Si—O—Si bonds. Further, a silanol group will undergo dehydration condensation reaction with a hydroxy group (substrate-OH) on the surface of a substrate, to form a chemical bond (substrate-O—Si).

L may, for example, be an alkoxy group, a halogen atom, an acyl group, an acyloxy group or an isocyanate group. The alkoxy group is preferably a $C_{1-4}$ alkoxy group. The halogen atom is preferably a chlorine atom.

L is, in view of easy production of the compound 1, preferably an alkoxy group or a halogen atom. L is, since outgassing during application will be less, and storage stability of the compound 1 will be excellent, preferably a $C_{1-4}$ alkoxy group, and in a case where long term storage stability of the compound 1 is required, particularly preferably an ethoxy group, and in a case where the reaction time after coating should be short, particularly preferably a methoxy group.

$R^4$ is a hydrogen atom or a monovalent hydrocarbon group. The monovalent hydrocarbon group may, for example, be an alkyl group, a cycloalkyl group, an alkenyl group or an allyl group.

$R^4$ is preferably a monovalent hydrocarbon group, particularly preferably a monovalent saturated hydrocarbon group. The number of carbon atoms in the monovalent saturated hydrocarbon group is preferably from 1 to 6, more preferably from 1 to 3, particularly preferably from 1 to 2. When the number of carbon atoms in $R^4$ is within such a range, the compound 1 is likely to be produced.

n is preferably 0 or 1, particularly preferably 0. By the presence of a plurality of L in one hydrolyzable silyl group, bonding to the substrate will be more firm.

$SiR^4{}_nL_{3-n}$ is preferably $Si(OCH_3)_3$, $SiCH_3(OCH_3)_2$, $Si(OCH_2CH_3)_3$, $SiCl_3$, $Si(OCOCH_3)_3$ or $Si(NCO)_3$. In view of handling efficiency in industrial production, $Si(OCH_3)_3$ is particularly preferred.

The two or more $SiR^4{}_nL_{3-n}$ in the compound 1 may be the same or different. From the production efficiency of the compound 1, they are preferably the same group.

The group g2 is preferably group g3 or group g4, in that the compound 1 is easily produced and the resulting surface layer will be more excellent in abrasion resistance, light resistance and chemical resistance.

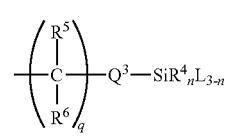
formula g3

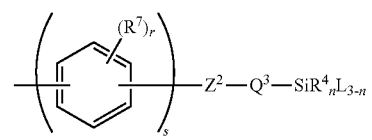
formula g4 wherein $R^5$ and $R^6$ are each independently a hydrogen atom, a $C_{1-6}$ monovalent organic group (excluding one having a hydrolyzable silyl group) or $-Q^3-SiR^4{}_nL_{3-n}$, q is an integer of from 0 to 10, when q is at least 2, the q ($CR^5R^6$) may be the same or different, $R^7$ is a $C_{1-6}$ monovalent organic group (excluding one having a hydrolyzable silyl group) or $-Z^2-Q^3-SiR^4{}_nL_{3-n}$, r is an integer of from 0 to 4, when r is at least 2, the r $R^7$ may be the same or different, s is 1 or 2, when s is 2, the two ($\varphi(R^7)_r$) (wherein $\varphi$ is a benzene ring) may be the same or different, $Z^2$ is a single bond or $—C(O)N(R^8)—$, $R^8$ is a hydrogen atom or an alkyl group, $Q^3$ is a $C_{2-10}$ alkylene group, $R^4$ is a hydrogen atom or a monovalent hydrocarbon group, L is a hydrolyzable group, n is an integer of from 0 to 2, and the plurality of $-Q^3-SiR^4{}_nL_{3-n}$ may be the same or different.

The monovalent organic group as each of $R^5$ and $R^6$ is particularly preferably a $C_{1-4}$ monovalent organic group.

In a case where $R^5$ and $R^6$ are not $-Q^3-SiR^4{}_nL_{3-n}$, they are each independently preferably a hydrogen atom or a $C_{1-4}$ alkyl group in view of availability of the raw material, particularly preferably a hydrogen atom or a methyl group.

q is preferably an integer of from 0 to 2, in that the compound 1 is easily produced and the resulting surface layer will be more excellent in abrasion resistance, light resistance and chemical resistance.

The monovalent organic group as $R^7$ is particularly preferably a $C_{1-4}$ monovalent organic group.

In a case where $R^7$ is not $-Z^2-Q^3-SiR^4{}_nL_{3-n}$, $R^7$ is preferably a $C_{1-4}$ alkyl group, particularly preferably a methyl group, in view of availability of raw material.

r is preferably an integer of from 0 to 2, more preferably 0 or 1, particularly preferably 0, in that the compound 1 is easily produced and the resulting surface layer will be more excellent in abrasion resistance, light resistance and chemical resistance.

s is preferably 1, in that the compound 1 is easily produced and the resulting surface layer will be more excellent in abrasion resistance, light resistance and chemical resistance.

$Z^2$ is preferably a single bond, in that the resulting surface layer will be more excellent in abrasion resistance, light resistance and chemical resistance.

$R^8$ is preferably a hydrogen atom in that the compound 1 is easily produced.

When $R^8$ is an alkyl group, the number of carbon atoms is preferably from 1 to 3, particularly preferably 1.

The number of carbon atoms in $Q^3$ is preferably from 2 to 6, particularly preferably from 2 to 4.

The group g2 may, for example, be —CH$_2$CH$_2$—Si(OCH$_3$)$_3$ or —CH$_2$CH$_2$CH$_2$—Si(OCH$_3$)$_3$.

As the compound 1, for example, compounds 1-1 to 1-12 may be mentioned. The following compounds are preferred from such a viewpoint that they are industrially easy to manufacture and easy to handle, and they provide a surface layer further excellent in water/oil repellency, abrasion resistance, fingerprint stain removability, lubricity, chemical resistance, light resistance and chemical resistance.

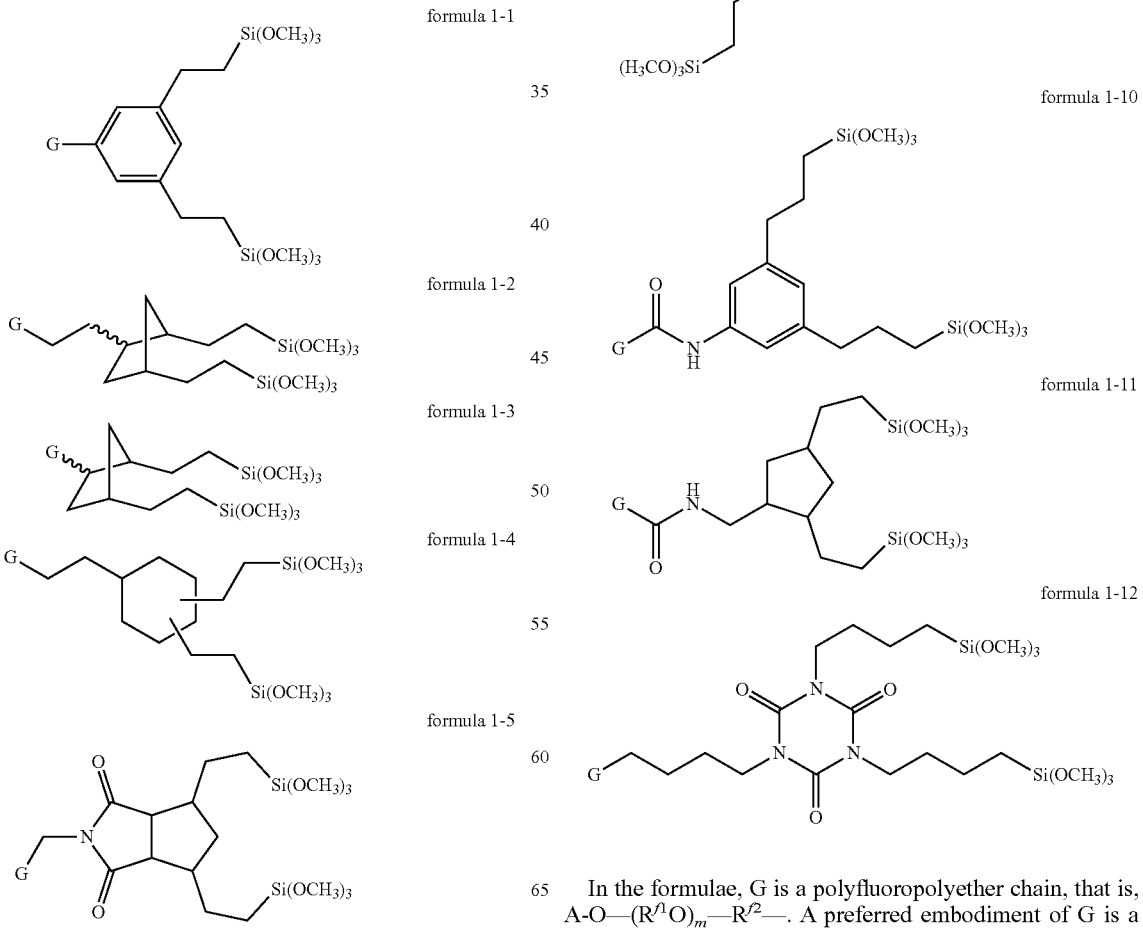

In the formulae, G is a polyfluoropolyether chain, that is, A-O—(R$^{f1}$O)$_m$—R$^{f2}$—. A preferred embodiment of G is a combination of the above preferred A, (R$^{f1}$O)$_m$ and R$^{f2}$.

(Method for Producing Compound 1)

The compound 1 may be produced by a method of subjecting compound 2 and $HSiR^4{}_nL_{3-n}$ to hydrosilylation.

$$A-O-(R^{f1}O)_m-R^{f2}-Z^1-Q^1(R^{1a})_b \qquad \text{formula 2}$$

wherein $R^{1a}$ is a monovalent organic group having at least one ω-alkenyl group (excluding one having a hydrolyzable silyl group), the b $R^{1a}$ may be the same or different, $R^{1a}$ becomes $R^1$ in the compound 1 after hydrosilylation.

A, $(R^{f1}O)_m$, $R^{f2}$, $Z^1$, $Q^1$ and b are the same as A, $(R^{f1}O)_m$, $R^{f2}$, $Z^1$, $Q^1$ and b as described for the compound 1, and the preferred embodiments are also the same.

The monovalent organic group having at least one ω-alkenyl group in $R^{1a}$ is preferably group g5 in that a preferred compound 1 is obtained.

$$-Q^{2a}[-CH=CH_2]_p \qquad \text{formula g5}$$

wherein $Q^{2a}$ is a single bond (only when p is 1) or a (p+1) valent organic group (excluding one having a hydrolyzable silyl group). The group g5 becomes $Q^2$ in the group g2 after hydrosilylation.

p is the same as p as described for the group g2, and the preferred embodiment is also the same.

The group g5 is preferably group g6 or group g7 in that a preferred compound 1 is obtained.

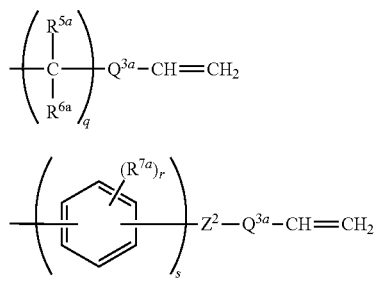

formula g6 formula g7 wherein $R^{5a}$ and $R^{6a}$ are a hydrogen atom, a $C_{1-6}$ monovalent organic group (excluding one having a hydrolyzable silyl group) or $-Q^{3a}-CH=CH_2$, q is an integer of from 0 to 10, when q is at least 2, the q $(CR^{5a}R^{6a})$ may be the same or different, $R^{7a}$ is a $C_{1-6}$ monovalent organic group (excluding one having a hydrolyzable silyl group) or $-Z^2-Q^{3a}-CH=CH_2$, r is an integer of from 0 to 4, when r is at least 2, the r $R^{7a}$ may be the same or different, s is 1 or 2, when s is 2, the two $(\varphi(R^{7a})_r)$ (wherein φ is a benzene ring) may be the same or different, $Z^2$ is a single bond or $-C(O)N(R^8)-$, $R^8$ is a hydrogen atom or an alkyl group, $Q^{3a}$ is a single bond or a $C_{1-8}$ alkylene group, and the plurality of $Q_{3a}$ may be the same or different.

$R^{5a}$, $R^{6a}$ and $R^{7a}$ become $R^5$, $R^6$ and $R^7$ in the group g3 or g4 after hydrosilylation. $-Q^{3a}-CH=CH_2$ becomes $Q^3$ in the group g3 or g4 after hydrosilylation.

q, r, s and $Z^2$ are the same as q, r, s and $Z^2$ as described for the group g3 or g4, and the preferred embodiments are also the same.

(Method for Producing Compound 2)

The compound 2 may be produced, for example, by introducing a carbon-carbon unsaturated double bond to the terminal of the compound 3 to 5 via a cyclic structure.

$$A-O-(R^{f1}O)_m-R^{f2}-C(O)OR^9 \qquad \text{formula 3}$$

$$A-O-(R^{f1}O)_m-R^{f2}-CF_2OC(O)R^{f3} \qquad \text{formula 4}$$

$$A-O-(R^{f1}O)_m-R^{f2}-I \qquad \text{formula 5}$$

wherein $R^9$ is a hydrogen atom or a monovalent organic group, $R^{f3}$ is a perfluoroalkyl group or a group having an etheric oxygen atom between carbon atoms of a perfluoroalkyl group having at least 2 carbon atoms, A, $(R^{f1}O)_m$ and $R^{f2}$ are the same as A, $(R^{f1}O)_m$ and $R^{f2}$ as described for the compound 1 and the preferred embodiments are also the same.

$R^9$ is preferably an alkyl group. The number of carbon atoms in the alkyl group is preferably from 1 to 10, particularly preferably 1.

The compounds 3 and 4 may be produced by the method disclosed in WO2009/008380, WO2013/121984, WO2013/121986, WO2015/087902, WO2017/038830, WO2017/038832 or the like.

The compound 5 may be produced by the method disclosed in WO2009/008380, WO2013/121984, WO2013/121986 or the like.

Now, a preparation route for compound 2 will be exemplified. In the formulae, G is a polyfluoropolyether chain, that is, $A-O-(R^{f1}O)_m-R^{f2}-$, [rad] is a radical polymerization initiator, base is a basic compound, LDA is lithium diisopropylamide, R is an alkyl group, and $Boc_2O$ is di-tert-butyl dicarbonate.

A preparation route for compound 2-2 which is a precursor of the compound 1-2 is as follows.

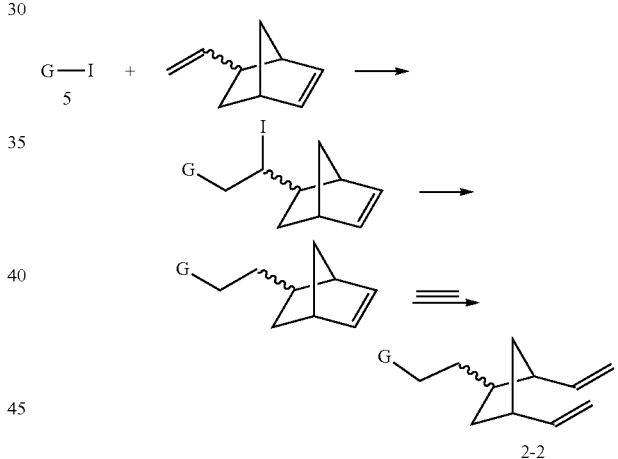

2-2

A preparation route for compound 2-3 which is a precursor of the compound 1-3 is as follows.

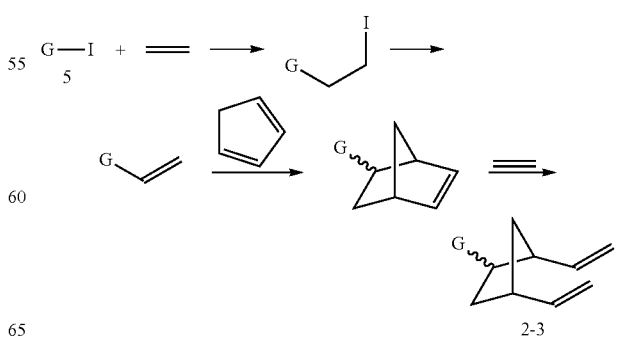

2-3

A preparation route for compound 2-5 which is a precursor of the compound 1-5 is as follows.
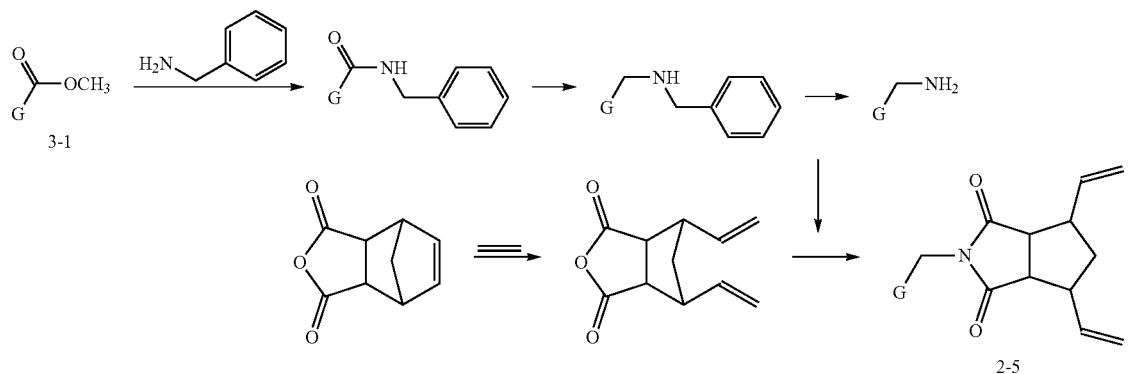
A preparation route for compound 2-6 which is a precursor of the compound 1-6 is as follows.
A preparation route for compound 2-7 which is a precursor of the compound 1-7 is as follows.
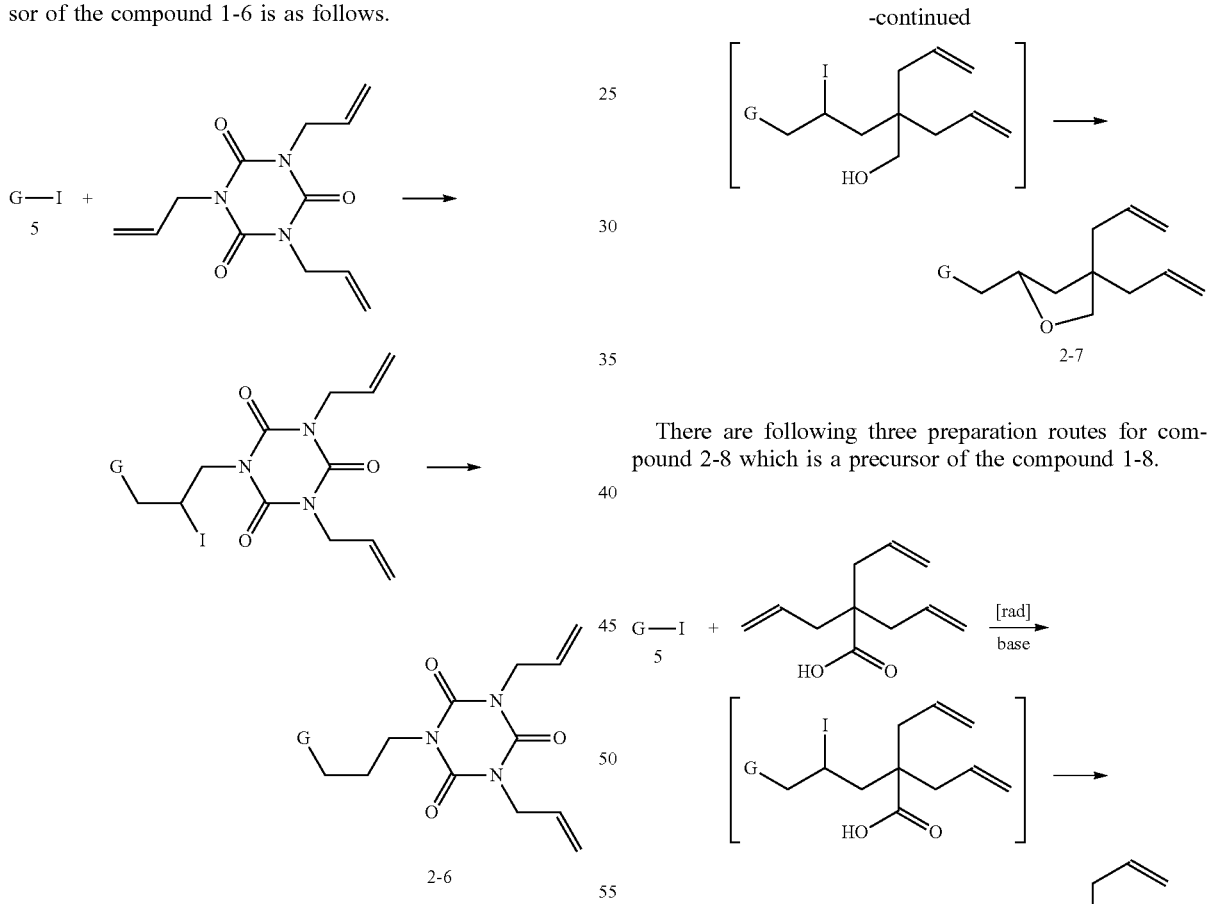
There are following three preparation routes for compound 2-8 which is a precursor of the compound 1-8.
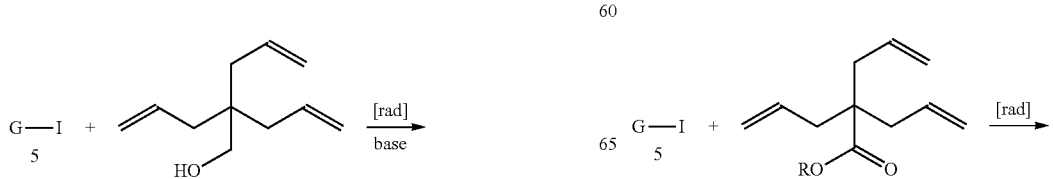

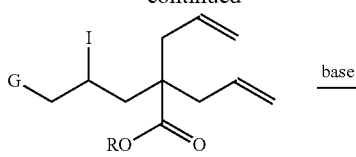

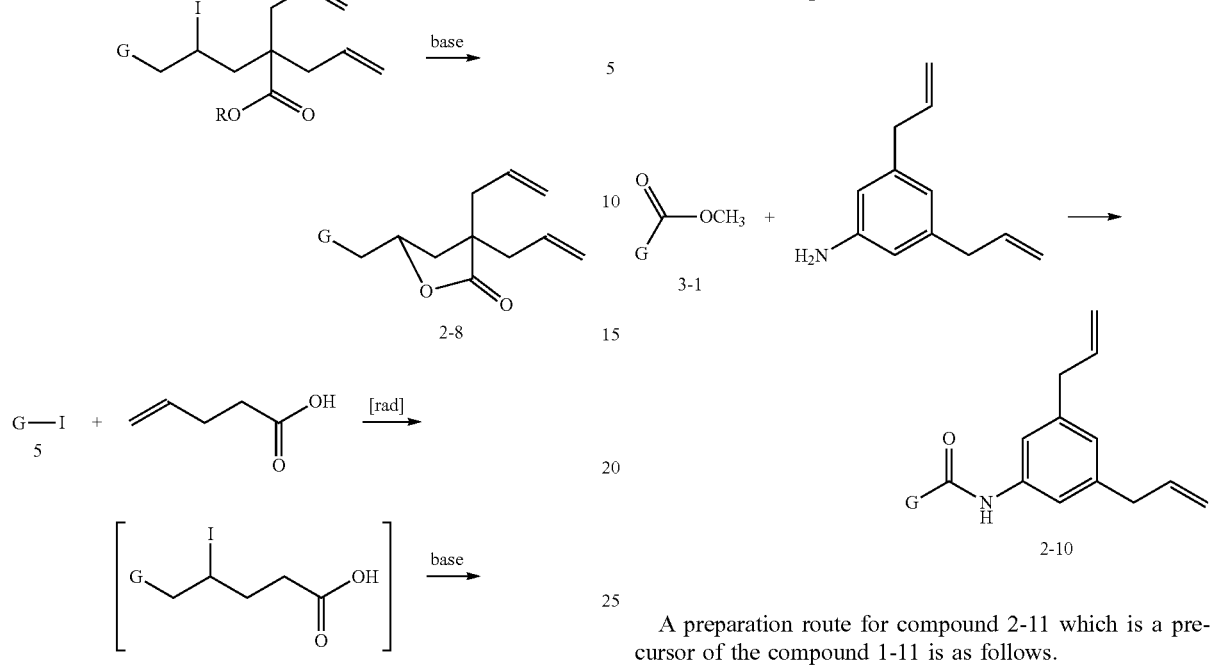

A preparation route for compound 2-9 which is a precursor of the compound 1-9 is as follows.

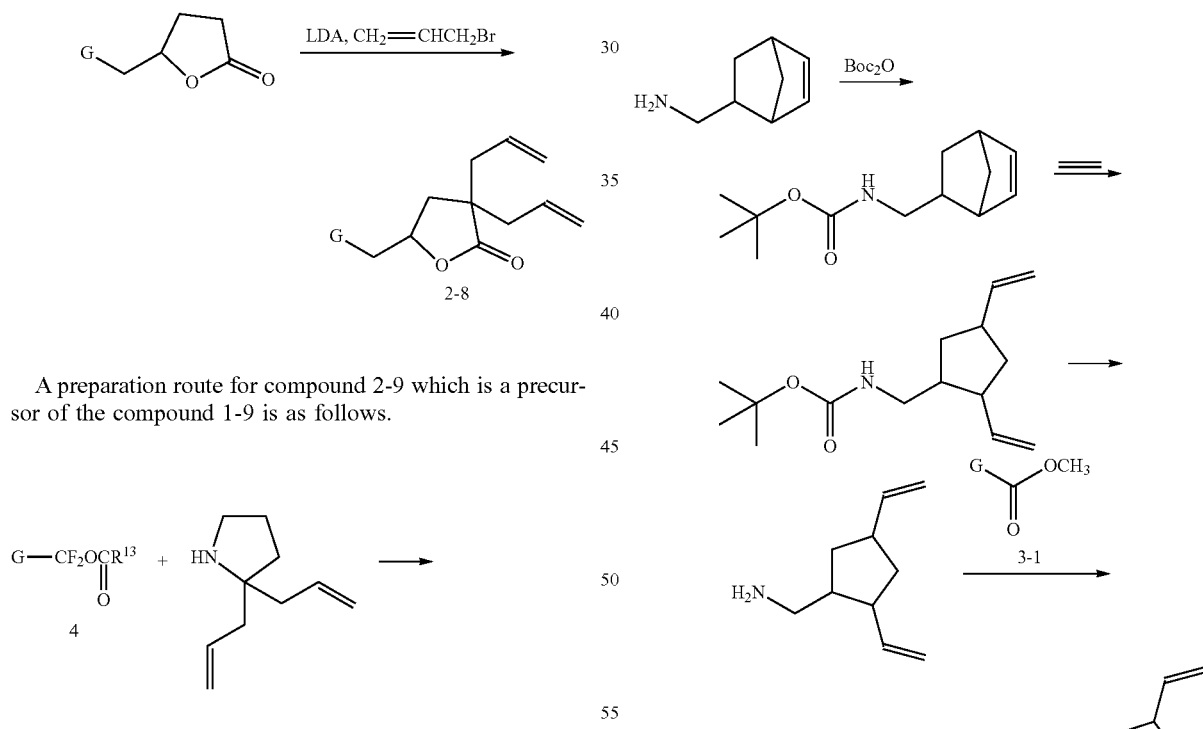

A preparation route for compound 2-10 which is a precursor of the compound 1-10 is as follows.

A preparation route for compound 2-11 which is a precursor of the compound 1-11 is as follows.

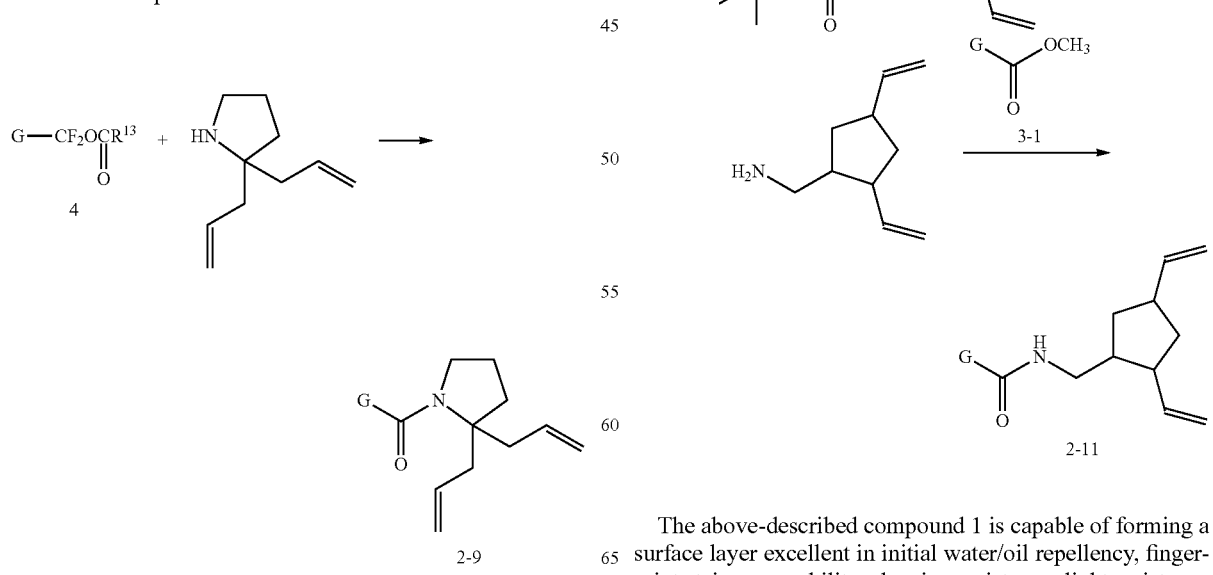

The above-described compound 1 is capable of forming a surface layer excellent in initial water/oil repellency, fingerprint stain removability, abrasion resistance, light resistance and chemical resistance, from the following reasons.

The compound 1, in which A has $CF_3$— at its terminal, has $CF_3$— at one terminal thereof, and has hydrolyzable silyl groups at the other end. According to the compound 1 having $CF_3$— at one terminal and hydrolyzable silyl groups at the other terminal, a surface layer having a low surface energy can be formed, which is excellent in lubricity and abrasion resistance. Whereas a surface layer formed of a fluorinated ether compound having a hydrolyzable silyl group at both terminals is insufficient in lubricity and abrasion resistance.

The compound 1 has $(R^{f1}O)_m$ and thereby has a high fluorine atom content. Accordingly, the compound 1 is capable of forming a surface layer excellent in initial water/oil repellency, abrasion resistance and fingerprint stain removability. Further, $(R^{f1}O)_m$ has a linear structure since $R^{f1}$ is a linear fluoroalkylene group. According to the compound 1 wherein $(R^{f1}O)m$ has a linear structure, the surface layer will be excellent in abrasion resistance and lubricity. On the other hand, with a fluorinated ether compound in which the poly(oxyperfluoroalkylene) chain has branches, the surface layer is slightly inferior in abrasion resistance and lubricity.

According to the compound 1 in which $R^{f2}$ is also a linear fluoroalkylene group, the surface layer will be excellent in abrasion resistance and lubricity.

The compound 1 has a cyclic structure introduced between the polyfluoropolyether chain and the hydrolysable silyl group, and accordingly the bond between the polyfluoropolyether chain and the hydrolyzable silyl group is hardly completely cleaved e.g. by friction, light or chemicals. Specifically, for example, even if one part in the aromatic ring in the compound 1-1 is cleaved, the two hydrolysable silyl groups are still bonded to the fluoropolyether chain. Accordingly, the compound 1 is capable of forming a surface layer excellent in abrasion resistance, light resistance and chemical resistance.

[Fluorinated Ether Composition]

The fluorinated ether composition of the present invention (hereinafter sometimes referred to as "the present composition") comprises at least one type of the compound 1 and other fluorinated ether compound.

As other fluorinated ether compound, a fluorinated ether compound formed as a by-product during production of the compound 1 (hereinafter sometimes referred to as "by-product fluorinated ether compound") and a known fluorinated ether compound used in the same applications as the compound 1 may, for example, be mentioned.

Other fluorinated ether compound is preferably one unlikely to impair the properties of the compound 1.

As the by-product fluorinated ether compound, unreacted compounds 2 to 5, and fluorinated ether compounds formed through isomerization of some of the allyl groups into an inner olefin accompanying hydrosilylation during the production of the compound 1 may, for example, be mentioned.

As the known fluorinated ether compound, a commercially available fluorinated ether compound may, for example, be mentioned. In a case where the present composition contains a known fluorinated ether compound, it may have new effects such as compensation for the properties of the compound 1.

The content of the compound 1 is preferably at least 60 mass % and less than 100 mass %, more preferably at least 70 mass % and less than 100 mass %, particularly preferably at least 80 mass % and less than 100 mass % in the present composition.

The content of other fluorinated ether compound is preferably more than 0 mass % and at most 40 mass %, more preferably more than 0 mass % and at most 30 mass %, particularly preferably more than 0 mass % and at most 20 mass % in the present composition.

The total content of the compound 1 and other fluorinated ether compound is preferably from 80 to 100 mass %, particularly preferably from 85 to 100 mass % in the present composition.

When the content of the compound 1 and the content of other fluorinated ether compound are within the above ranges, the resulting surface layer will be more excellent in initial water/oil repellency, abrasion resistance, fingerprint stain removability, light resistance and chemical resistance.

The present composition may contain a component other than the compound 1 and other fluorinated ether compound within a range not to impair the effects of the present invention.

Other component may, for example, be a by-product formed during production of the compound 1 or the known fluorinated ether compound (excluding the by-product fluorinated ether compound) or a compound inevitable in production such as an unreacted raw material.

Further, additives such as an acid catalyst or a basic catalyst to promote hydrolysis and condensation reaction of the hydrolyzable silyl group may be mentioned. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide or ammonia.

The content of other component is preferably from 0 to 10 mass %, particularly preferably from 0 to 1 mass % in the present composition.

[Coating Liquid]

The coating liquid of the present invention (hereinafter sometimes referred to as "the present coating liquid") comprises the compound 1 or the present composition, and a liquid medium. The present coating liquid may be a solution or a dispersion.

The liquid medium is preferably an organic solvent. The organic solvent may be a fluorinated organic solvent, may be a non-fluorinated organic solvent, or may contain both solvents.

The fluorinated organic solvent may, for example, be a fluorinated alkane, a fluorinated aromatic compound, a fluoroalkyl ether, a fluorinated alkylamine, a fluoroalcohol, etc.

The fluorinated alkane is preferably a $C_{4-8}$ compound. Commercially available products may, for example, be $C_6F_{13}H$ (manufactured by Asahi Glass Company, Limited, ASAHIKLIN (registered trademark) AC-2000), $C_6F_{13}C_2H_5$ (manufactured by Asahi Glass Company, Limited, ASAHIKLIN (registered trademark) AC-6000), and $C_2F_5CHFCHFCF_3$ (manufactured by Chemours, Vertrel (registered trademark) XF).

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. Commercially available products may, for example, be $CF_3CH_2OCF_2CF_2H$ (manufactured by Asahi Glass Company, Limited, ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200), and $C_2F_5CF(OCH_3)C_3F_7$ (manufactured by 3M, Novec (registered trademark) 7300).

The fluorinated alkylamine may, for example, be perfluorotripropylamine or perfluorotributylamine, The fluoroalcohol may, for example, be 2,2,3,3-tetrafluoropropanol, 2,2,2-trifluoroethanol or hexafluoroisopropanol.

The non-fluorinated organic solvent is preferably a compound consisting solely of hydrogen atoms and carbon atoms, or a compound consisting solely of hydrogen atoms, carbon atoms and oxygen atoms, and may be a hydrocarbon, an alcohol, a ketone, an ether, or an ester.

The liquid medium may be a mixed medium having two or more types mixed.

The content of the compound 1 or the present composition is preferably from 0.001 to 10 mass %, particularly preferably from 0.01 to 1 mass % in the present coating liquid.

The content of the liquid medium is preferably from 90 to 99.999 mass %, particularly preferably from 99 to 99.99 mass % in the present coating liquid.

[Article]

The article of the present invention (hereinafter sometimes referred to as "the present article") has a surface layer formed of the compound 1 or the present composition on the surface of a substrate.

The surface layer contains the compound 1 in a state where some or all of hydrolyzable silyl groups in the compound 1 are hydrolyzed and subjected to dehydration condensation reaction.

The thickness of the surface layer is preferably from 1 to 100 nm, particularly preferably from 1 to 50 nm. When the thickness of the surface layer is at least the lower limit value of the above range, the effect by the surface treatment is likely to be sufficiently obtained. When the thickness of the surface layer is at most the upper limit value of the above range, utilization efficiency will be high. The thickness of the surface layer can be calculated from an oscillation period of an interference pattern of reflected X-ray, obtained by X-ray reflectance method using an X-ray diffractometer for thin film analysis (manufactured by Rigaku Corporation, ATX-G).

The substrate may be a substrate which is desired to have water/oil repellency imparted. The material of the substrate may, for example, be a metal, a resin, glass, sapphire, ceramic, stone or a composite material thereof. The glass may be chemically tempered. The substrate may have a primer film such as a $SiO_2$ film formed on its surface.

As the substrate, a substrate for a touch panel, a substrate for display or a spectacle lens is preferred, and a substrate for a touch panel is particularly preferred. As the material of a substrate for a touch panel, glass or a transparent resin is preferred.

[Method for Producing Article]

The present article may be produced, for example, by the following method.

A method of treating the surface of a substrate by dry coating method using the compound 1 or the present composition, to form a surface layer formed of the compound 1 or the present composition on the surface of the substrate.

A method of applying the present coating liquid to the surface of a substrate by wet coating method, followed by drying to form a surface layer formed of the compound 1 or the present composition on the surface of the substrate.

As the dry coating method, a method such as vacuum deposition, CVD or sputtering may be mentioned. With a view to suppressing decomposition of the compound 1 and from the viewpoint of simplicity of apparatus, vacuum deposition method is preferred. At the time of vacuum deposition, a pelletized material having a metal porous product of iron, steel of the like impregnated with the compound 1 or the present composition may be used. A pelletized material impregnated with the compound 1 or the present composition, obtained by impregnating a metal porous product of iron, steel of the like with the present coating liquid and drying the liquid medium, may be used.

The wet coating method may, for example, be a spin coating method, a wipe coating method, a spray coating method, a squeegee coating method, a dip coating method, a die coating method, an ink-jet method, a flow coating method, a roll coating method, a casting method, a Langmuir-Blodgett method, or a gravure coating method.

EXAMPLES

Now, the present invention will be described in further detail with reference to Examples, but the present invention is not limited to these Examples. Hereinafter, "%" is "mass %" unless otherwise specified. Ex. 1 to 4 and 7 to 10 are Examples of the present invention, and Ex. 5, 6, 11 and 12 are Comparative Examples.

Ex. 1

Ex. 1-1

Compound 4-1 was obtained in accordance with the method disclosed in Ex. 11-1 to 11-3 in WO2013/121984.

$$CF_3-O-(CF_2CF_2O-CF_2CF_2CF_2CF_2-O)_xCF_2CF_2O-CF_2CF_2CF_2-CF_2OC(O)CF(CF_3)OCF_2CF_2CF_3 \quad \text{formula 4-1}$$

Mean value of unit number x: 13, number average molecular weight of compound 4-1: 5,050.

In the following, $CF_3-O-(CF_2CF_2O-CF_2CF_2CF_2CF_2O)_xCF_2CF_2O-CF_2CF_2CF_2-$ in the compound 4-1 will be represented as $G^1$-.

Ex. 1-2

Into a 50 mL three-necked flask, 10.0 g of the compound 4-1 obtained in Ex. 1-1, 1.50 g of 2,2-diallylpyrrolidine (manufactured by Aldrich) and 10 g of 1,3-bis(trifluoromethyl)benzene were put and stirred at 25° C. for 8 hours. The reaction crude liquid was concentrated by an evaporator to obtain 10.4 g of a crude product. The crude product was subjected to silica gel column chromatography to obtain 9.5 g (yield: 99%) of compound 2-9.

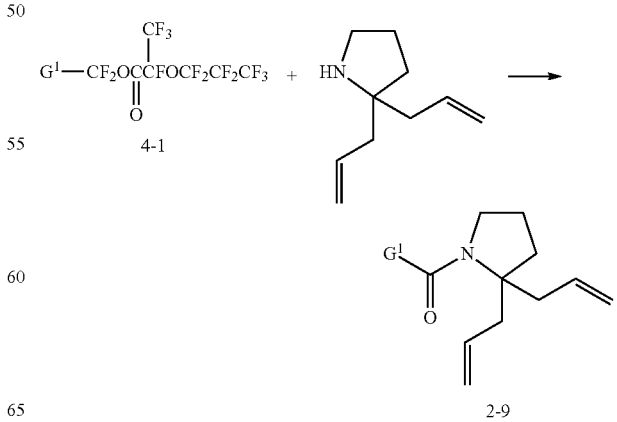

NMR spectrum of compound 2-9:

$^1$H-NMR (300.4 MHz, solvent: CDCl$_3$, reference: tetramethylsilane (TMS)) δ (ppm): 5.8 (2H), 4.9 (4H), 3.8 (2H), 2.5 (4H), 2.3-1.4 (4H).

$^{19}$F-NMR (282.7 MHz, solvent: CDCl$_3$, reference: CFCl$_3$) δ (ppm): −56 (3F), −83 (58F), −88 (58F), −91 (2F)−120 (2F), −126 (58F)

Mean value of unit number x: 13.

Ex. 1-3

Into a 100 mL eggplant flask made of a tetrafluoroethylene/perfluoro(alkoxyvinyl ether) copolymer, 5.0 g of the compound 2-9 obtained in Ex. 1-2, 0.03 g of a xylene solution (platinum content: 2%) of a platinum/1,3-divinyl-1,1,3,3-tetramethyldisiloxane complex, 0.36 g of trimethoxysilane (manufactured by Tokyo Chemical Industry Co., Ltd.), 0.01 g of aniline and 2.0 g of 1,3-bis(trifluoromethyl)benzene were put, followed by stirring at 25° C. for 8 hours. The solvent and the like were distilled off under reduced pressure, and the residue was subjected to filtration through a membrane filter having a pore size of 0.5 μm to obtain 5.2 g (purity: 99% or higher, yield: 99%) of compound 1-9.

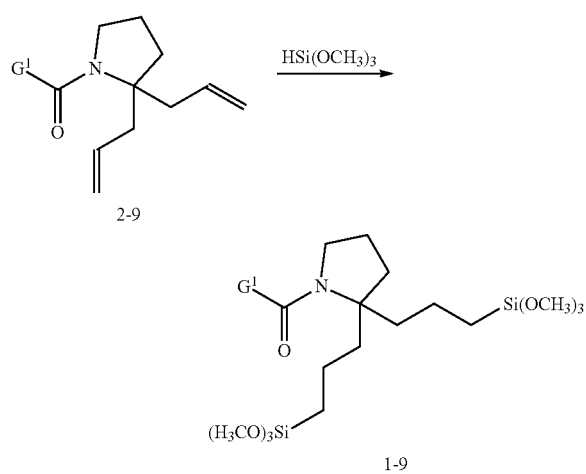

NMR spectrum of compound 1-9:

$^1$H-NMR (300.4 MHz, solvent: CDCl$_3$, reference: TMS) δ (ppm): 3.9-3.5 (20H), 2.3-1.4 (12H), 1.0-0.5 (4H).

$^{19}$F-NMR (282.7 MHz, solvent: CDCl$_3$, reference: CFCl$_3$) δ (ppm): −56 (3F), −83 (58F), −88 (58F), −91 (2F)−120 (2F), −126 (58F).

Mean value of unit number x: 13, number average molecular weight of compound 1-9: 4,400.

Ex. 2

Ex. 2-1

Compound 3-1 was obtained in accordance with the method disclosed in Ex. 2-3 in WO2013/121984.

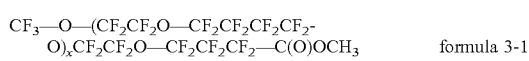

formula 3-1

Mean value of unit number x: 13, number average molecular weight of compound 3-1: 4,900.

In the following, CF$_3$—O—(CF$_2$CF$_2$O—CF$_2$CF$_2$CF$_2$CF$_2$O)$_x$CF$_2$CF$_2$O—CF$_2$CF$_2$CF$_2$— in the compound 3-1 will be represented as G$^2$-.

Ex. 2-2

Into a 200 mL eggplant flask, 5.02 g of compound 6-1, 6.16 g of triethylamine, 0.080 g of dimethylaminopyridine and 100 mL of tetrahydrofuran were put, followed by stirring in an ice bath. Then, 10.9 g of di-tert-butyl dicarbonate was put, the temperature of the reaction system was raised to 25° C., followed by stirring for one hour. Liquid separation was conducted with ethyl acetate, and the resulting organic solvent layer was concentrated. The obtained crude product was purified by silica gel column chromatography to obtain 7.90 g (yield: 87%) of compound 6-2.

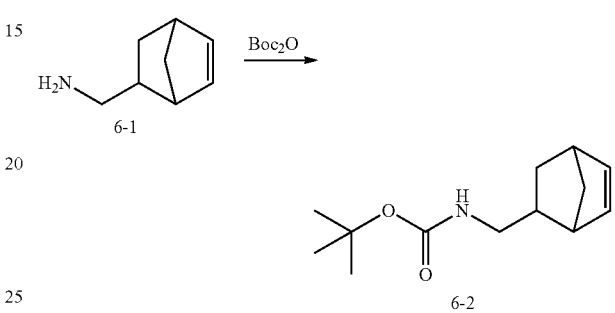

NMR spectrum of compound 6-2:

$^1$H-NMR (300.4 MHz, solvent: CDCl$_3$, reference: TMS) δ (ppm): 6.1 (1H), 5.9 (1H), 4.5 (1H), 3.2-2.5 (5H), 2.2 (1H), 1.8 (1H), 1.4 (9H), 1.2 (1H), 0.5 (1H).

Ex. 2-3

Into a 1 L autoclave, 7.17 g of the compound 6-2 obtained in Ex. 2-2 and 800 mL of toluene were put, followed by freeze deaeration, and 16 g of ethylene was put until the pressure gauge of the autoclave reached 0.4 MPa [gauge]. A solution having 0.40 g of benzylidene{1,3-bis(2,4,6-trimethylphenyl)-2-imidazolidinylidene}dichloro(tricyclohexylphosphine)ruthenium (Grubbs second-generation catalyst) dissolved in 5 mL of toluene was injected, followed by stirring at 25° C. for 22 hours. The reaction mixture was purified by silica gel column chromatography to obtain 1.1 g (yield: 15%) of compound 6-3.

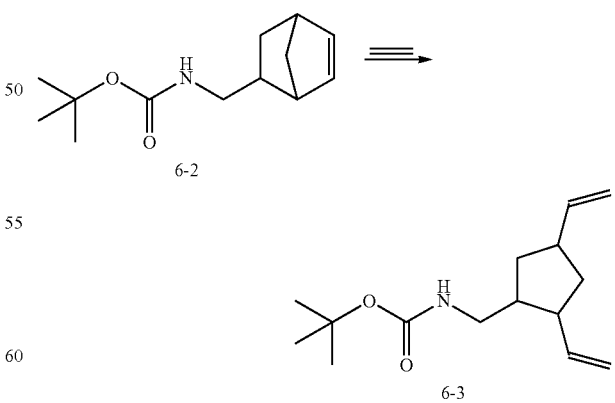

NMR spectrum of compound 6-3:

$^1$H-NMR (300.4 MHz, solvent: CDCl$_3$, reference: TMS) δ (ppm): 5.8 (2H), 4.9 (4H), 3.1 (2H), 2.7 (1H), 2.5 (1H), 2.2 (1H), 2.0 (2H), 1.5-1.0 (11H).

Ex. 2-4

Into a 200 mL eggplant flask, 1.1 g of the compound 6-3 obtained in Ex. 2-3 and 50 mL of methylene chloride were put, followed by stirring in an ice bath. Then, 1.6 g of trifluoroacetic acid was put, followed by stirring at 25° C. for one hour. Then, 50 mL of a 10% sodium hydroxide aqueous solution was put, followed by stirring. A liquid separation operation was conducted, the resulting organic layer was dried over magnesium sulfate, and magnesium sulfate was removed by filtration. The organic layer was concentrated to obtain 0.58 g (yield: 87%) of compound 6-4.

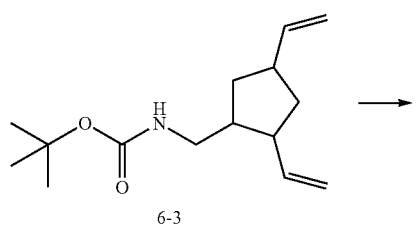

NMR spectrum of compound 6-4:

$^1$H-NMR (300.4 MHz, solvent: CDCl$_3$, reference: TMS) δ (ppm): 5.8 (2H), 5.0 (4H), 3.6 (2H), 3.7 (2H), 3.5 (2H), 2.2-1.9 (3H), 1.4-1.0 (2H).

Ex. 2-5

Into a 100 mL eggplant flask, 0.29 g of the compound 6-4 obtained in Ex. 2-4, 5.0 g of the compound 3-1 obtained in Ex. 2-1 and 5.1 g of AC-6000 were put, followed by stirring at 60° C. for two days. The obtained crude product was purified by silica gel column chromatography to obtain 4.30 g (yield: 89%) of compound 2-11.

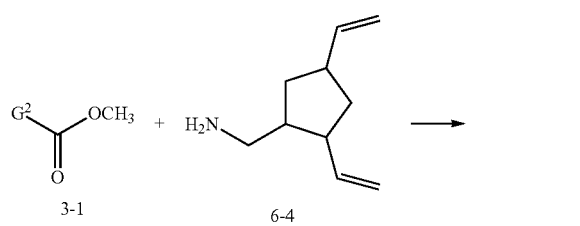

NMR spectrum of compound 2-11:

$^1$H-NMR (300.4 MHz, solvent: CDCl$_3$, reference: TMS) δ (ppm): 5.7 (2H), 4.9 (4H), 3.4 (1H), 3.2 (1H), 2.7 (1H), 2.5 (1H), 2.2 (1H), 1.9 (2H), 1.4-1.0 (2H).

$^{19}$F-NMR (282.7 MHz, solvent: CDCl$_3$, reference: CFCl$_3$) δ (ppm): −56 (3F), −83 (58F), −88 (58F), −91 (2F)−120 (2F), −126 (58F).

Ex. 2-6

Into a 50 mL eggplant flask, 1.1 g of the compound 2-11 obtained in Ex. 2-5, 0.073 g of trimethoxysilane, 0.0001 g of aniline, 1.0 g of AC-6000 and 0.0033 g of a platinum/1,3-divinyl-1,1,3,3-tetramethyldisiloxane complex were put, followed by stirring at 25° C. overnight. The solvent and the like were distilled off under reduced pressure to obtain 1.1 g (yield: 100%) of compound 1-11.

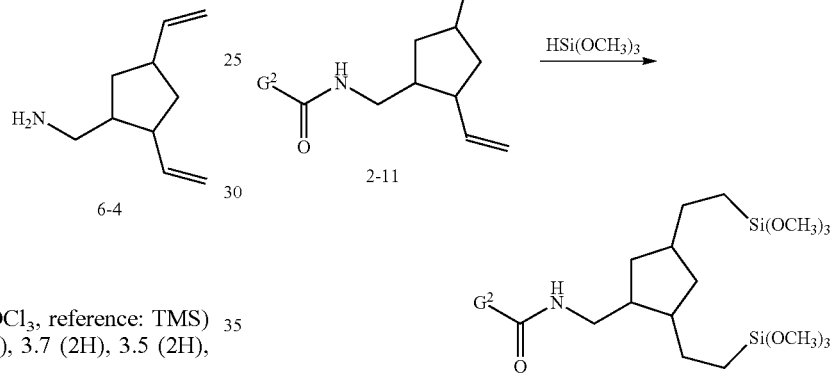

NMR spectrum of compound 1-11:

$^1$H-NMR (300.4 MHz, solvent: CDCl$_3$, reference: TMS) δ (ppm): 3.6-3.2 (20H), 2.3-1.4 (5H), 1.2-0.5 (10H).

$^{19}$F-NMR (282.7 MHz, solvent: CDCl$_3$, reference: CFCl$_3$) δ (ppm): −56 (3F), −83 (58F), −88 (58F), −91 (2F)−120 (2F), −126 (58F).

Mean value of unit number x: 13, number average molecular weight of compound 1-11: 4,500.

Ex. 3

Ex. 3-1

Into a 1 L autoclave, 5.1 g of compound 7-1 and 785 mL of toluene were put, followed by freeze deaeration, and 15 g of ethylene was put until the pressure gauge of the autoclave reached 0.4 MPa [gauge]. A solution having 0.090 g of benzylidene{1,3-bis(2,4,6-trimethylphenyl)-2-imidazolidinylidene}dichloro(tricyclohexylphosphine)ruthenium (Grubbs second-generation catalyst) dissolved in 3 mL of toluene was injected, followed by stirring at 25° C. for 24 hours. The reaction mixture was purified by silica gel column chromatography to obtain 4.7 g (yield: 80%) of compound 7-2.

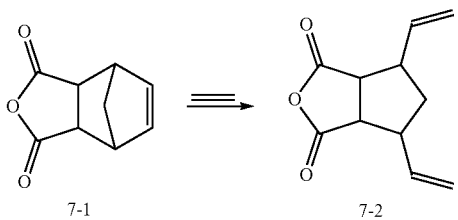

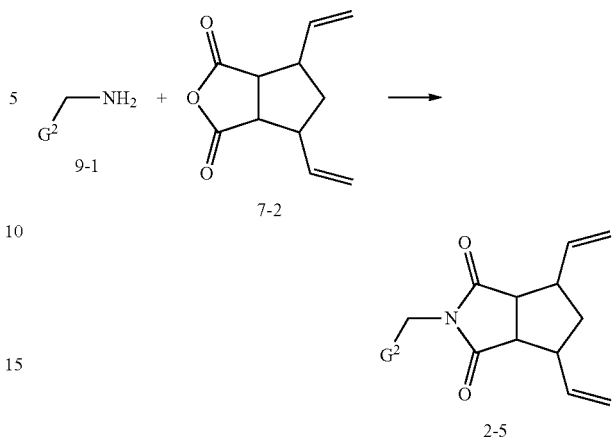

NMR spectrum of compound 7-2:
$^1$H-NMR (300.4 MHz, solvent: CDCl$_3$, reference: TMS) δ (ppm) 5.9 (2H), 5.2 (4H), 3.5 (2H), 3.0 (2H), 2.0 (1H), 1.4 (1H).

Ex. 3-2

Into a 100 mL pressure resistant reactor, 15 g of the compound 3-1 obtained in Ex. 2-1, 50 g of dichloropentafluoropropane (manufactured by Asahi Glass Company, Limited, AK-225) and 7.5 g of a 2.0 mol/L ammonia/methanol solution were put, followed by stirring at 25° C. for 6 hours. The solvent was distilled off to obtain 14.8 g (yield: 99%) of compound 8-1.

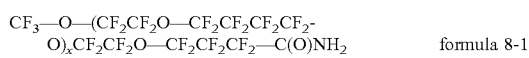
formula 8-1

NMR spectrum of compound 8-1:
$^{19}$F-NMR (282.7 MHz, solvent: CDCl$_3$, reference: CFCl$_3$) δ (ppm): −55 (3F), −82 (53F), −87 (53F), −90 (2F), −119 (2F), −123 to −128 (55F).
Mean value of unit number x: 13.

Ex. 3-3

Into a 200 mL eggplant flask, 10 g of the compound 8-1 obtained in Ex. 3-2, 50 g of AK-225 and 20 g of diethyl ether were put, followed by stirring in an ice bath. Then, 0.194 g of lithium aluminum hydride was slowly added, followed by stirring at 25° C. for 20 hours. 0.2 mL of a saturated sodium sulfate aqueous solution was put, and precipitated solids were removed by Celite filtration. The filtrate was concentrated and purified by silica gel column chromatography to obtain 4.48 g (yield: 45%) of compound 9-1

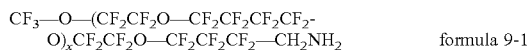
formula 9-1

NMR spectrum of compound 9-1:
$^1$H-NMR (300.4 MHz, solvent: CDCl$_3$, reference: TMS) δ (ppm): 3.2 (2H).
$^{19}$F-NMR (282.7 MHz, solvent: CDCl$_3$, reference: CFCl$_3$) δ (ppm): −55 (3F), −82 (59F), −87 (59F), −90 (2F), −122 (2F), −123 to −128 (61F).
Mean value of unit number x: 13.

Ex. 3-4

Into a 200 mL eggplant flask, 2.70 g of the compound 9-1 obtained in Ex. 3-3, 0.26 g of N-ethyl-N,N-diisopropylamine and 200 mL of 1,3-bistrifluoromethylbenzene were put, followed by stirring. Then, 0.29 g of the compound 7-2 obtained in Ex. 3-1 was put, 15 g of molecular sieves 4 A were put, followed by stirring under reflux. After stirring for 72 hours, the solvent and the like were distilled off, and the crude product was purified by silica gel column chromatography to obtain 1.29 g (yield: 46%) of compound 2-5.

NMR spectrum of compound 2-5:
$^1$H-NMR (300.4 MHz, solvent: CDCl$_3$, reference: TMS) δ (ppm): 6.0 (2H), 5.0 (4H), 4.2 (2H), 3.2 (2H), 2.9 (2H), 1.9 (1H), 1.4 (1H).
$^{19}$F-NMR (282.7 MHz, solvent: CDCl$_3$, reference: CFCl$_3$) δ (ppm): −55 (3F), −82 (59F), −87 (59F), −90 (2F), −116 (2F), −123 to −128 (61F).
Mean value of unit number x: 13.

Ex. 3-5

Into a 50 mL eggplant flask, 1 g of the compound 2-5 obtained in Ex. 3-4, 0.09 g of trimethoxysilane, 0.0009 g of aniline, 1.0 g of AC-6000 and 0.0033 g of a platinum/1,3-divinyl-1,1,3,3-tetramethyldisiloxane complex were put, followed by stirring at 25° C. overnight. The solvent and the like were distilled off under reduced pressure to obtain 1.0 g (yield: 100%) of compound 1-5.

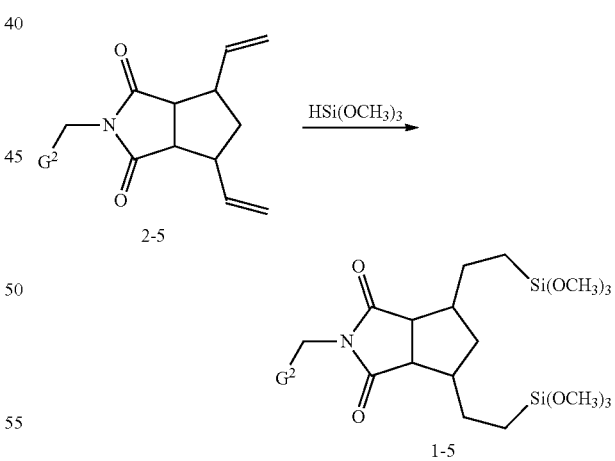

NMR spectrum of compound 1-5:
$^1$H-NMR (300.4 MHz, solvent: CDCl$_3$, reference: TMS) δ (ppm): 4.4 (2H), 3.8 (18H), 3.4 (2H), 2.4 to 3.8 (7H), 1.3 to 0.9 (5H).
$^{19}$F-NMR (282.7 MHz, solvent: CDCl$_3$, reference: CFCl$_3$) δ (ppm): −55 (3F), −82 (59F), −87 (59F), −90 (2F), −119 (2F), −123 to −128 (61F).
Mean value of unit number x: 13, number average molecular weight of compound 1-11: 3,700.

Ex. 4

Ex. 4-1

Into a 500 mL eggplant flask, 20 g of isocyanuric acid, 80 g of water and 39 g of a 48% sodium hydroxide aqueous solution were put, followed by stirring at 70° C. for 4 hours. Then, water was distilled off, and the obtained crystals were washed with methanol. The crystals were vacuum dried at 100° C. overnight to completely remove water thereby to obtain 29.8 g of a white solid. 22.0 g of the obtained solid was put in a 300 mL eggplant flask, and 55 g of N,N-dimethylformamide and 50.2 g of 4-bromo-1-butene were put, followed by stirring at 95° C. overnight. The solid was removed by filtration at 25° C., the solvent was distilled off from the filtrate, and the obtained crude product was purified by silica gel column chromatography to obtain 4.3 g of compound 10-1.

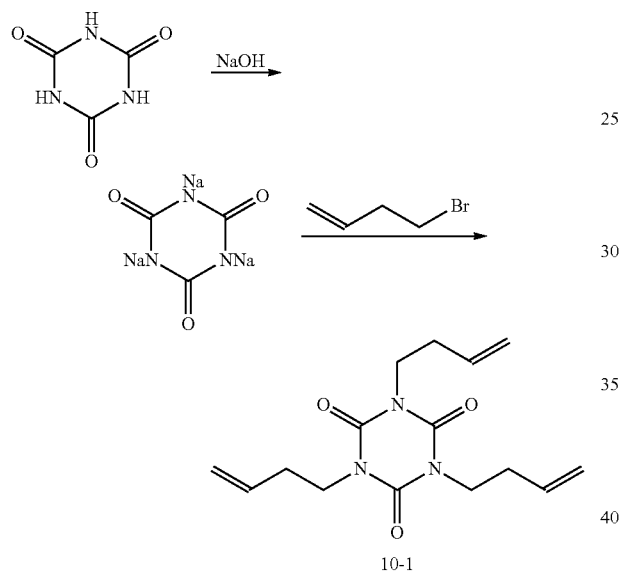

NMR spectrum of compound 10-1:
$^1$H-NMR (300.4 MHz, solvent: CDCl$_3$, reference: TMS) δ (ppm): 5.7 (3H), 5.0 (6H), 3.9 (6H), 2.4 (6H).

Ex. 4-2

Into a 500 mL eggplant flask shielded with an aluminum foil, 5.8 g of sodium pyrithione and 100 mL of 1,3-bistrifluoromethylbenzene (tradename: SR-solvent) were put, followed by stirring in an ice bath. Then, 50.0 g of the compound 4-1 obtained in Ex. 1-1 was slowly added, followed by stirring for 2 hours in the ice bath as it was. Then, 12.0 g iodine and 1.8 g of 2,2-azobis(2-methylbutylonitrile) (tradename: V-59) were put, and the aluminum foil for shielding was removed, followed by stirring at 85° C. overnight. The temperature was returned to 25° C., methanol was put, followed by sufficient stirring, and AC-6000 was added for separation into two layers, the lower layer was recovered, and the solvent was distilled off. The obtained crude product was purified by silica gel column chromatography to obtain 39.8 g (yield: 84%) of compound 5-1.

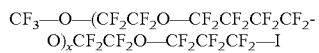

formula 5-1

NMR spectrum of compound 5-1:
$^{19}$F-NMR (282.7 MHz, solvent: CDCl$_3$, reference: CFCl$_3$) δ (ppm): −55 (3F), −58 (2F), −83 (50F), −88 (52F), −90 (2F), −116 (2F), −125 (52F).

Mean value of unit number x: 13.

Ex. 4-3

Into a 50 mL eggplant flask, 4.0 g of the compound 5-1 obtained in Ex. 4-2, 2.3 g of the compound 10-1 obtained in Ex. 4-1, 12.5 mL of SR-solvent and 30 mg of V-59 were put, followed by stirring at 85° C. for 2 days. During stirring, 60 mg of V-59 was added dividedly in two times. The reaction temperature was returned to 25° C., methanol was added, followed by sufficient stirring, AC-6000 was added for separation into two layers, the lower layer was recovered, and the solvent was distilled off. The obtained crude product was purified by silica gel column chromatography to obtain 1.58 g (yield: 37%) of compound 11-1.

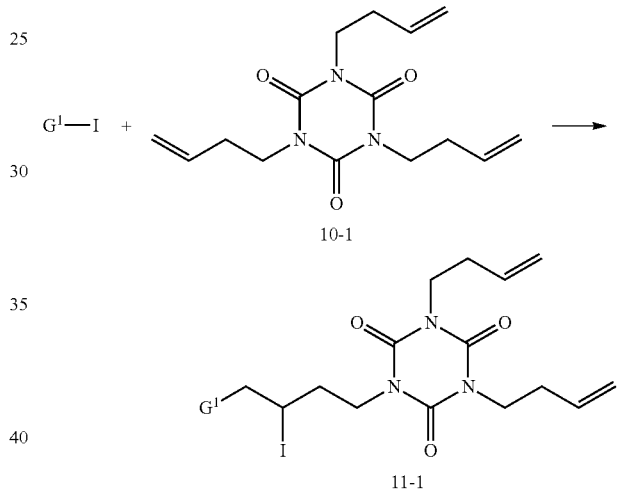

NMR spectrum of compound 11-1:
$^1$H-NMR (300.4 MHz, solvent: CDCl$_3$, reference: TMS) δ (ppm): 5.8 (2H), 5.0 (4H), 4.4 to 3.9 (7H), 3.2 to 2.8 (2H), 2.4 to 2.4 (6H).

$^{19}$F-NMR (282.7 MHz, solvent: CDCl$_3$, reference: CFCl$_3$) δ (ppm): −55 (3F), −81 to −83 (50F), −88 (52F), −90 (2F), −110 to −115 (2F), −125 to −127 (52F).

Mean value of unit number x: 13.

Ex. 4-4

Into a 50 mL eggplant flask, 0.85 g of the compound 11-1 obtained in Ex. 4-3, 81 mg of tris(trimethylsilyl)silane, 3.0 mL of SR-solvent and 23 mg of V-59 were put, followed by stirring at 85° C. for 5 hours. The reaction temperature was returned to 25° C., methanol was added, followed by sufficient stirring, AC-6000 was added for separation into two layers, the lower layer was recovered, and the solvent was distilled off. The obtained crude product was purified by silica gel column chromatography to obtain 0.34 g (yield: 40%) of compound 2-12.

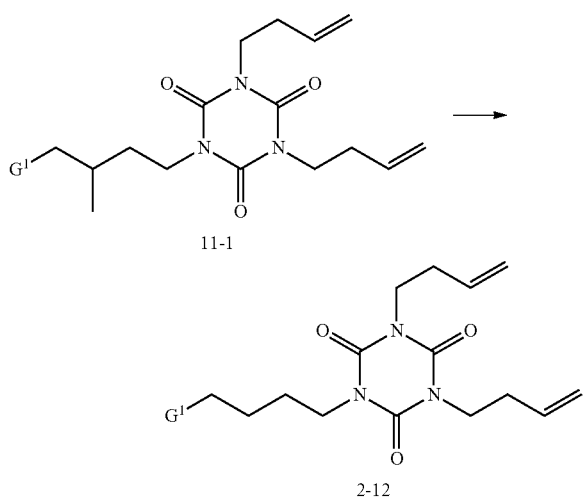

11-1

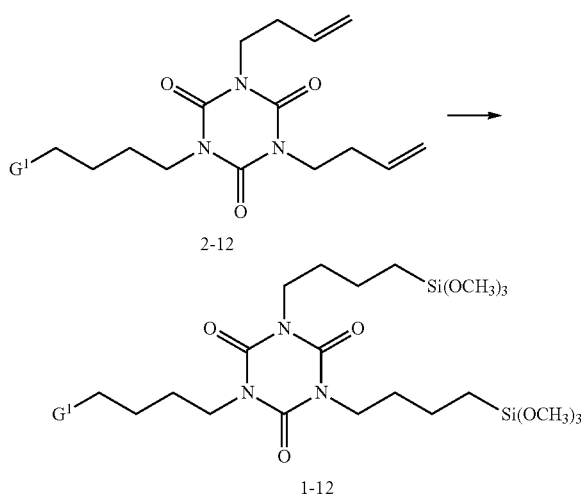

2-12

NMR spectrum of compound 2-12:

$^1$H-NMR (300.4 MHz, solvent: CDCl$_3$, reference: TMS) δ (ppm): 5.7 (2H), 5.0 (4H), 4.2 to 3.9 (8H), 2.5 to 1.6 (8H).

$^{19}$F-NMR (282.7 MHz, solvent: CDCl$_3$, reference: CFCl$_3$) δ (ppm): −55 (3F), −81 to −83 (50F), −88 (52F), −90 (2F), −113 (2F), −125 to −127 (52F).

Mean value of unit number x: 13.

Ex. 4-5

Into a 50 mL eggplant flask, 0.33 g of the compound 2-12 obtained in Ex. 4-4, 0.025 g of trimethoxysilane, 0.0002 g of aniline, 0.33 g of AC-6000 and 0.0011 g of a platinum/1,3-divinyl-1,1,3,3-tetramethyldisiloxane complex were put, followed by stirring at 25° C. overnight. The solvent and the like were distilled off under reduced pressure to obtain 0.33 g (yield: 100%) of compound 1-12.

2-12

1-12

NMR spectrum of compound 1-12:

$^1$H-NMR (300.4 MHz, solvent: CDCl$_3$, reference: TMS) δ (ppm): 4.4 to 3.8 (8H), 3.6 (18H), 2.8 to 1.9 (6H)1.8 to 1.4 (10H).

$^{19}$F-NMR (282.7 MHz, solvent: CDCl$_3$, reference: CFCl$_3$) δ (ppm): −55 (3F), −81 to −83 (50F), −88 (52F), −90 (2F), −113 (2F), −125 to −127 (52F).

Mean value of unit number x: 13, number average molecular weight of compound 1-12: 4,000.

Ex. 5

Compound 12-1 was obtained in accordance with the method disclosed in Ex. 3 in WO2017/038832.

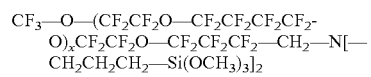

formula 12-1

Mean value of unit number x: 13.

Ex. 6

Compound 12-2 was obtained in accordance with the method disclosed in Ex. 6 in WO2013/121984.

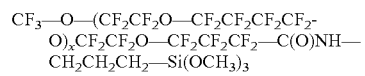

formula 12-2

Mean value of unit number x: 13.

Ex. 7 to 12: Production and Evaluation of Article

Using the compound obtained in each of Ex. 1 to 6, a substrate was surface-treated to obtain an article in each of Ex. 7 to 12. As the surface treatment method, in each Ex., the following dry coating method and wet coating method were respectively employed. As the substrate, chemically tempered glass was used. With respect to the obtained article, evaluations were carried out by the following methods. The results are shown in Table 1.

(Dry Coating Method)

The dry coating was carried out by using a vacuum deposition apparatus (manufactured by ULVAC Co., VTR 450M) (vacuum deposition method). 0.5 g of the compound obtained in each of Ex. 1 to 6 was filled in a boat made of molybdenum in the vacuum deposition apparatus, and inside of the vacuum deposition apparatus was evacuated to a level of at most 1×10$^{-3}$ Pa. The boat having the compound placed therein was heated at a temperature raising rate of at most 10° C./min, and at the time when the vapor deposition rate by a quartz oscillator film thickness meter exceeded 1 nm/sec, the shutter was opened to initiate film deposition on the surface of a substrate. When the film thickness became about 50 nm, the shutter was closed to terminate film deposition on the surface of the substrate. The substrate on which the compound was deposited, was subjected to heat treatment at 200° C. for 30 minutes, followed by washing with AK-225 to obtain an article having a surface layer on the surface of the substrate.

(Wet Coating Method)

The compound obtained in each of Ex. 1 to 5, and C$_4$F$_9$OC$_2$H$_5$ (manufactured by 3M, Novec (registered trademark) 7200) as a medium, were mixed to prepare a coating liquid having a solid content concentration of 0.05%. A substrate was dipped in the coating liquid and allowed to stand for 30 minutes, whereupon the substrate was taken out (dip coating method). The coating film was dried at 200° C. for 30 minutes and washed with AK-225, to obtain an article having a surface layer on the surface of the substrate.

(Evaluation Methods)

<Method for Measuring Contact Angle>

The contact angle of about 2 μL of distilled water or n-hexadecane placed on the surface of the surface layer, was measured by using a contact angle measuring apparatus (manufactured by Kyowa Interface Science Co., Ltd., DM-500). Measurements were conducted at five different points on the surface of the surface layer, and the average value was calculated. For the calculation of the contact angle, a 2θ method was employed.

<Initial Contact Angle>

With respect to the surface layer, the initial water contact angle and the initial n-hexadecane contact angle were measured by the above-described measuring method. The evaluation standards are as follows.

Initial water contact angle:
⊚ (excellent): at least 115 degrees.
○ (good): at least 110 degrees and less than 115 degrees.
Δ (acceptable): at least 100 degrees and less than 110 degrees.
x (poor): less than 100 degrees.

Initial n-hexadecane contact angle:
⊚ (excellent): at least 66 degrees.
○ (good): at least 65 degrees and less than 66 degrees.
Δ (acceptable): at least 63 degrees and less than 65 degrees.
x (poor): less than 63 degrees.

<Light Resistance>

To the surface layer, by means of a tabletop xenon arc lamp type accelerated light resistance testing machine (manufactured by Toyo Seiki Seisaku-sho, Ltd., SUNTEST XLS+), light (650 W/m$^2$, 300 to 700 nm) was applied at a black panel temperature of 63° C. for 1,000 hours, whereupon the water contact angle was measured. The smaller the decrease in water contact angle after the accelerated light resistance test, the smaller the decrease in performance due to light, and the better the light resistance. The evaluation standards are as follows.

⊚ (excellent): The change in water contact angle after the accelerated light resistance test is at most 2 degrees.
○ (good): The change in water contact angle after the accelerated light resistance test is more than 2 degrees and at most 5 degrees.
Δ (acceptable): The change in water contact angle after the accelerated light resistance test is more than 5 degrees and at most 10 degrees.
x (poor): The change in water contact angle after the accelerated light resistance test is more than 10 degrees.

<Abrasion Resistance (Steel Wool)>

With respect to the surface layer, in accordance with JIS L0849: 2013 (ISO 105-X12: 2001), using a reciprocating traverse testing machine (manufactured by KNT Co.), steel wool Bon Star (#0000) was reciprocated 10,000 times under a pressure of 98.07 kPa at a speed of 320 cm/min, whereupon the water contact angle was measured. The smaller the decrease in water repellency (water contact angle) after the friction, the smaller the decrease in performance due to friction, and the better the abrasion resistance. The evaluation standards are as follows.

⊚ (excellent): The change in water contact angle after reciprocation of 10,000 times is at most 2 degrees.
○ (good): The change in water contact angle after reciprocation of 10,000 times is more than 2 degrees and at most 5 degrees.
Δ (acceptable): The change in water contact angle after reciprocation of 10,000 times is more than 5 degrees and at most 10 degrees.
x (poor): The change in water contact angle after reciprocation of 10,000 times is more than 10 degrees.

<Chemical Resistance (Alkali Resistance)>

The article was immersed in a 1N aqueous sodium hydroxide solution (pH: 14) for 5 hours, then washed with water and air-dried, whereupon the water contact angle was measured. The smaller the decrease in water contact angle after the test, the smaller the decrease in performance due to alkali, and the better the alkali resistance. The evaluation standards are as follows.

⊚ (excellent): The change in water contact angle after the alkali resistance test is at most 2 degrees.
○ (good): The change in water contact angle after the alkali resistance test is more than 2 degrees and at most 5 degrees.
Δ (acceptable): The change in water contact angle after the alkali resistance test is more than 5 degrees and at most 10 degrees.
x (poor): The change in water contact angle after the alkali resistance test is more than 10 degrees.

<Chemical Resistance (Salt Water Resistance)>

The salt spray test was carried out in accordance with JIS H8502. That is, the article was exposed to salt atmosphere in a salt spray tester (manufactured by Suga Test Instruments Co., Ltd.) for 300 hours, and then, the water contact angle was measured. The smaller the decrease in water contact angle after the test, the smaller the decrease in performance due to salt water, and the better the salt water resistance. The evaluation standards are as follows.

⊚ (excellent): The change in water contact angle after the salt spray test is at most 2 degrees.
○ (good): The change in water contact angle after the salt spray test is more than 2 degrees and at most 5 degrees.
Δ (acceptable): The change in water contact angle after the salt spray test is more than 5 degrees and at most 10 degrees.
x (poor): The change in water contact angle after the salt spray test is more than 10 degrees.

<Fingerprint Stain Removability>

An artificial fingerprint liquid (liquid consisting of oleic acid and squalene) was deposited on a flat surface of a silicon rubber plug, and then, extra oil was wiped off by a nonwoven fabric (manufactured by Asahi Kasei Corporation, BEMCOT (registered trademark) M-3), to prepare a stamp for fingerprint. The fingerprint stamp was placed on the surface layer and pressed under a load of 9.8 N for 10 seconds. The haze at a portion having a fingerprint put, was measured by a haze meter and taken as an initial value. With respect to the portion having a fingerprint put, using a reciprocating traverse testing machine (manufactured by KNT Co.) having tissue paper attached, wiping was carried out under a load of 4.9 N. The value of haze was measured every one reciprocation for wiping, and the number of wiping times until the haze became at most 10% of the initial value, was measured. The smaller the number of wiping times, the easier the removal of fingerprint stain, and the better the fingerprint stain removability. The evaluation standards are as follows.

⊚ (excellent): The number of wiping times is at most 3 times.
○ (good): The number of wiping times is from 4 to 5 times.
Δ (acceptable): The number of wiping times is from 6 to 8 times.
x (poor): The number of wiping times is at least 9 times.

TABLE 1

| Ex. | | | 7 | 8 | 9 | 10 | 11 | 12 |
|---|---|---|---|---|---|---|---|---|
| Fluorinated ether compound | | | Compound 1-9 | Compound 1-11 | Compound 1-5 | Compound 1-12 | Compound 12-1 | Compound 12-2 |
| Dry coating method | Initial contact angle | Water | ⊚ | ⊚ | ⊚ | ⊚ | ⊚ | ⊚ |
| | | n-Hexadecane | ⊚ | ⊚ | ⊚ | ⊚ | ⊚ | ⊚ |
| | Light resistance | | ○ | ○ | ○ | ○ | X | △ |
| | Abrasion resistance | | ○ | ○ | ○ | ○ | △ | X |
| Wet coating method | Initial contact angle | Water | ⊚ | ⊚ | ⊚ | ⊚ | ⊚ | ⊚ |
| | | n-Hexadecane | ⊚ | ⊚ | ⊚ | ⊚ | ⊚ | ⊚ |
| | Light resistance | | ○ | ○ | ○ | ○ | X | △ |
| | Abrasion resistance | | ○ | ○ | ○ | ○ | △ | X |
| | Chemical resistance | Alkali resistance | ○ | ○ | ○ | ○ | X | X |
| | | Salt water resistance | ⊚ | ⊚ | ⊚ | ⊚ | ○ | ○ |
| Fingerprint stain removability | | | ⊚ | ⊚ | ⊚ | ⊚ | ⊚ | ⊚ |

It was confirmed that in Ex. 7 to 10 in which the compound 1 was used, the initial water/oil repellency, abrasion resistance, fingerprint stain removability, light resistance and chemical resistance were excellent.

In Ex. 11 and 12 in which conventional fluorinated ether compounds were used, abrasion resistance, light resistance and chemical resistance were inferior.

INDUSTRIAL APPLICABILITY

The fluorinated ether compound of the present invention is useful for various applications for which it is required to impart lubricity and water/oil repellency. For example, it may be used for a display input device such as a touch panel, surface protective coating on a transparent glass or transparent plastic member, kitchen antifouling coating, water repellent moistureproof coating or antifouling coating on electronic device, a heat exchanger or a battery, toiletry antifouling coating, coating on a member which requires liquid repellency while conducting electricity, water repellent/waterproof/water sliding coating on a heat exchanger, or a surface low friction coating on the inside of a vibrating strainer or a cylinder, etc. More specific examples of application include a front protective plate, an antireflection plate, a polarizing plate, an antiglare plate or a surface thereof having an antireflection film, of a display, an apparatus having a display input device of which the screen is operated by human fingers or hands, such as a touch panel sheet or a touch panel display of an apparatus such as a mobile phone or a personal digital assistant, a decorative building material for restroom, bathroom, lavatory, kitchen and the like, waterproof coating for a wiring board, water repellent/waterproof coating on a heat exchanger, water repellent coating on a solar cell, waterproof/water repellent coating on a printed wiring board, waterproof/water repellent coating for an electronic equipment casing or an electronic member, insulating property-improving coating on a power transmission line, waterproof/water repellent coating on a filter, waterproof coating on an electromagnetic wave absorption material or an acoustic material, antifouling coating for bathroom, kitchen instrument and toiletry, water repellent/waterproof/water sliding coating on a heat exchanger, surface low-friction coating on the inside of a vibrating strainer or a cylinder, surface protective coating on a machine component, a vacuum apparatus component, a bearing component, an automobile component, an industrial tool, etc.

The invention claimed is:

1. A fluorinated ether compound, which is a compound represented by the following formula 1:

$$A-O-(R^{f1}O)_m-R^{f2}-Z^1-Q^1(R^1)_b \qquad \text{formula 1}$$

wherein A is a $C_{1-20}$ perfluoroalkyl group,
$R^{f1}$ is a linear fluoroalkylene group,
m is an integer of from 2 to 500,
$(R^{f1}O)_m$ may consist of two or more types of $R^{f1}O$ differing in the number of carbon atoms,
$R^{f2}$ is a linear fluoroalkylene group (having at least one fluorine atom bonded to the carbon atom at the terminal on the $Z^1$ side),
$Z^1$ is a bond selected from the group consisting of —C(O)—, —C(O)NH—, —OC(O)O—, —NHC(O)O—, —NHC(O)NH— and —SO$_2$NH—, a bivalent organic group having a bond selected from the above group, a single bond or a group represented by the following formula g1,
$Q^1$ is a group having a (b+1) valent ring (excluding an organopolysiloxane ring) such that $Z^1$ and $R^1$ are directly bonded to an atom constituting the ring,
$R^1$ is a monovalent organic group having at least one hydrolyzable silyl group,
b is an integer of at least 2,
the b $R^1$ may be the same or different,

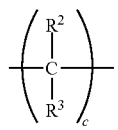

formula g1 wherein $R^2$ and $R^3$ are each independently a hydrogen atom, a halogen atom (excluding a fluorine atom) or a $C_{1-6}$ monovalent organic group (excluding one having a hydrolyzable silyl group),
c is a an integer of from 1 to 10, and
when c is at least 2, the c ($CR^2R^3$) may be the same or different.

2. The fluorinated ether compound according to claim 1, wherein the ring in $Q^1$ is a ring selected from the group consisting of a 3- to 8-membered alicyclic ring, a benzene ring, a 3- to 8-membered heterocyclic ring, and a condensed ring of two or more of such rings.

3. The fluorinated ether compound according to claim 1, wherein $Z^1$ is a bond selected from the group consisting of —C(O)— and —C(O)NH—, a bivalent organic group having a bond selected from the group consisting of —C(O)— and —C(O)NH—, a single bond, or a group represented by the formula g1.

4. The fluorinated ether compound according to claim 1, wherein $R^1$ is a group represented by the following formula g2:

$$-Q^2[-SiR^4_nL_{3-n}]_p \qquad \text{formula g2}$$

wherein $Q^2$ is a (p+1) valent organic group (excluding one having a hydrolyzable silyl group),
$R^4$ is a hydrogen atom or a monovalent hydrocarbon group,
L is a hydrolyzable group,
n is an integer of from 0 to 2,
p is an integer of at least 1, and when p is at least 2, the p [—SiR$^4_n$L$_{3-n}$] may be the same or different.

5. The fluorinated ether compound according to claim 4, wherein the group represented by the formula g2 is a group represented by the following formula g3 or g4:

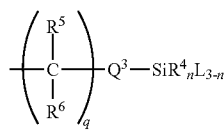
formula g3

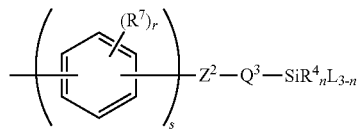
formula g4 wherein R$^5$ and R$^6$ are each independently a hydrogen atom, a C$_{1-6}$ monovalent organic group (excluding one having a hydrolyzable silyl group) or -Q$^3$-SiR$^4_n$L$_{3-n}$,
q is an integer of from 0 to 10,
when q is at least 2, the q (CR$^5$R$^6$) may be the same or different,
R$^7$ is a C$_{1-6}$ monovalent organic group (excluding one having a hydrolyzable silyl group) or -Z$^2$-Q$^3$-SiR$^4_n$L$_{3-n}$,
r is an integer of from 0 to 4,
when r is at least 2, the r R$^7$ may be the same or different,
s is 1 or 2,
when s is 2, the two ($\varphi$(R$^7$)$_r$) (wherein $\varphi$ is a benzene ring) may be the same or different,
Z$^2$ is a single bond or —C(O)N(R$^8$)—,
R$^8$ is a hydrogen atom or an alkyl group,
Q$^3$ is a C$_{2-10}$ alkylene group,
R$^4$ is a hydrogen atom or a monovalent hydrocarbon group,
L is a hydrolyzable group,
n is an integer of from 0 to 2, and
the plurality of -Q$^3$-SiR$^4_n$L$_{3-n}$ may be the same or different.

6. A fluorinated ether composition comprising at least one type of the fluorinated ether compound as defined in claim 1, and other fluorinated ether compound.

7. A coating liquid comprising the fluorinated ether compound as defined in claim 1, and a liquid medium.

8. An article comprising a substrate and a surface layer formed of the fluorinated ether compound as defined in claim 1 on a surface of the substrate.

9. A method for producing an article, which comprises treating a surface of a substrate by dry coating method using the fluorinated ether compound as defined in claim 1 to form a surface layer formed of the fluorinated ether compound on the surface of the substrate.

10. A method for producing an article, which comprises applying the coating liquid as defined in claim 7 to a surface of a substrate by wet coating method, followed by drying to form a surface layer formed of the fluorinated ether compound on the surface of the substrate.

11. A fluorinated ether compound, which is a compound represented by the following formula 2:

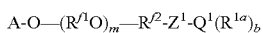
formula 2 wherein A is a C$_{1-20}$ perfluoroalkyl group,
R$^{f1}$ is a linear fluoroalkylene group,
m is an integer of from 2 to 500,
(R$^{f1}$O)$_m$ may consist of two or more types of R$^{f1}$O differing in the number of carbon atoms,
R$^{f2}$ is a linear fluoroalkylene group (having at least one fluorine atom bonded to the carbon atom at the terminal on the Z$^1$ side),
Z$^1$ is a bond selected from the group consisting of —C(O)—, —C(O)NH—, —OC(O)O—, —NHC(O)O—, —NHC(O)NH— and —SO$_2$NH—, a bivalent organic group having a bond selected from the above group, a single bond or a group represented by the following formula g1,
Q$^1$ is a group having a (b+1) valent ring (excluding an organopolysiloxane ring) such that Z$^1$ and R$^1$ are directly bonded to an atom constituting the ring,
R$^{1a}$ is a monovalent organic group having at least one $\omega$-alkenyl group (excluding one having a hydrolyzable silyl group),
b is an integer of at least 2,
the b R$^{1a}$ may be the same or different,

formula g1 wherein R$^2$ and R$^3$ are each independently a hydrogen atom, a halogen atom (excluding a fluorine atom) or a C$_{1-6}$ monovalent organic group (excluding one having a hydrolyzable silyl group),
c is an integer of from 1 to 10, and
when c is at least 2, the c (CR$^2$R$^3$) may be the same or different.

12. The fluorinated ether compound according to claim 11, wherein the ring in Q$^1$ is a ring selected from the group consisting of a 3- to 8-membered alicyclic ring, a benzene ring, a 3- to 8-membered heterocyclic ring, and a condensed ring of two or more of such rings.

13. The fluorinated ether compound according to claim 11, wherein Z$^1$ is a bond selected from the group consisting of —C(O)— and —C(O)NH—, a bivalent organic group having a bond selected from the group consisting of —C(O)— and —C(O)NH—, a single bond, or a group represented by the formula g1.

14. The fluorinated ether compound according to claim 11, wherein R$^{1a}$ is a group represented by the following formula g5:

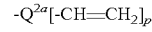
formula g5 wherein Q$^{2a}$ is a single bond (only when p is 1) or a (p+1) valent organic group (excluding one having a hydrolyzable silyl group), and
p is an integer of at least 1.

15. The fluorinated ether compound according to claim 14, wherein the group represented by the formula g5 is a group represented by the following formula g6 or g7:

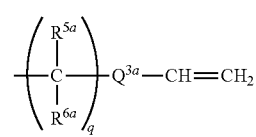
formula g6

-continued

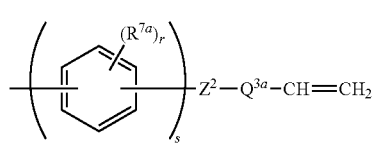
formula g7 wherein $R^{5a}$ and $R^{6a}$ are each independently a hydrogen atom, a $C_{1-6}$ monovalent organic group (excluding one having a hydrolyzable silyl group) or $-Q^{3a}-CH=CH_2$, q is an integer of from 0 to 10, when q is at least 2, the q $(CR^{5a}R^{6a})$ may be the same or different, $R^{7a}$ is a $C_{1-6}$ monovalent organic group (excluding one having a hydrolyzable silyl group) or $-Z^2-Q^{3a}-CH=CH_2$, r is an integer of from 0 to 4, when r is at least 2, the r $R^{7a}$ may be the same or different, s is 1 or 2, when s is 2, the two $(\varphi(R^{7a})_r)$ (wherein $\varphi$ is a benzene ring) may be the same or different, $Z^2$ is a single bond or $-C(O)N(R^8)-$, $R^8$ is a hydrogen atom or an alkyl group, $Q^{3a}$ is a single bond or a $C_{1-8}$ alkylene group, and the plurality of $Q^{3a}$ may be the same or different.

* * * * *